US009975296B2

(12) United States Patent
El-Siblani

(10) Patent No.: US 9,975,296 B2
(45) Date of Patent: May 22, 2018

(54) APPARATUS AND METHOD FOR FORMING THREE-DIMENSIONAL OBJECTS FROM SOLIDIFIABLE PASTE

(71) Applicant: Global Filtration Systems, Dearborn Heights, MI (US)

(72) Inventor: Ali El-Siblani, Dearborn Heights, MI (US)

(73) Assignee: Global Filtration Systems, Dearborn Heights, MI (US)

( * ) Notice: Subject to any disclaimer, the term of this patent is extended or adjusted under 35 U.S.C. 154(b) by 0 days. days.

(21) Appl. No.: 15/117,628

(22) PCT Filed: Feb. 6, 2015

(86) PCT No.: PCT/US2015/014726
§ 371 (c)(1),
(2) Date: Aug. 9, 2016

(87) PCT Pub. No.: WO2015/120214
PCT Pub. Date: Aug. 13, 2015

(65) Prior Publication Data
US 2016/0361872 A1 Dec. 15, 2016

Related U.S. Application Data

(63) Continuation of application No. 14/176,792, filed on Feb. 10, 2014, now Pat. No. 9,527,244.

(51) Int. Cl.
*B29C 67/00* (2017.01)
*B33Y 70/00* (2015.01)
(Continued)

(52) U.S. Cl.
CPC ........ *B29C 67/0066* (2013.01); *B29C 64/135* (2017.08); *B29C 64/40* (2017.08);
(Continued)

(58) Field of Classification Search
CPC .... B29C 64/205; B29C 64/209; B29C 64/236
See application file for complete search history.

(56) References Cited

U.S. PATENT DOCUMENTS

| 4,575,330 A | 3/1986 | Hull |
| 4,837,379 A | 6/1989 | Weinberg |

(Continued)

FOREIGN PATENT DOCUMENTS

| CN | 1769032 A | 5/2006 |
| CN | 101898423 A | 12/2010 |

(Continued)

OTHER PUBLICATIONS

Wohlers Report 2000. "Rapid Prototyping & Tooling State of the Industry Annual Worldwide Progress Report", T. Wohlers, Wohlers Association, Inc., Fort Collins, Colorado (2000).

(Continued)

*Primary Examiner* — James Sanders
(74) *Attorney, Agent, or Firm* — Hansen IP Law PLLC

(57) ABSTRACT

An apparatus and method for making a three-dimensional object from a solidifiable paste is shown and described. The apparatus includes a pastes spreader, at least a portion of which extends into the solidifiable paste. The container holding the solidifiable paste and the spreader are movable relative to one another. In one system, the spreader vibrates as the container and the spreader move relative to one another. In another system, the spreader is part of a spreader assembly in which a first spreader and second spreader are angled with respect to one another, and the assembly is rotatable and lockable into multiple rotational positions. A paste dispenser is also described which is configured to dispense paste while moving along a travel axis. The apparatus and method allow three-dimensional objects to be progressively built upside down by ensuring that the previously solidified object section has a substantially homoge- (Continued)

neous layer of solidifiable material available for forming a new layer of the solidified object prior to exposure to solidification energy.

10 Claims, 16 Drawing Sheets

(51) Int. Cl.
*B33Y 10/00* (2015.01)
*B33Y 30/00* (2015.01)
*B29C 64/135* (2017.01)
*B29C 64/40* (2017.01)
*B29K 105/16* (2006.01)

(52) U.S. Cl.
CPC ............... *B33Y 10/00* (2014.12); *B33Y 30/00* (2014.12); *B33Y 70/00* (2014.12); *B29K 2105/16* (2013.01)

(56) References Cited

U.S. PATENT DOCUMENTS

| | | | |
|---|---|---|---|
| 4,849,910 A | 7/1989 | Jacobs et al. | |
| 4,929,402 A | 5/1990 | Hull | |
| 4,999,143 A | 3/1991 | Hull et al. | |
| 5,049,901 A | 9/1991 | Gelbart | |
| 5,093,130 A | 3/1992 | Fuji et al. | |
| 5,104,592 A | 4/1992 | Hull et al. | |
| 5,136,515 A | 8/1992 | Helinski | |
| 5,137,662 A | 8/1992 | Hull et al. | |
| 5,139,338 A | 8/1992 | Pomerantz et al. | |
| 5,143,663 A | 9/1992 | Leyden et al. | |
| 5,157,423 A | 10/1992 | Zur | |
| 5,171,490 A | 12/1992 | Fudim | |
| 5,173,266 A | 12/1992 | Kenney | |
| 5,174,931 A | 12/1992 | Almquist et al. | |
| 5,236,637 A | 8/1993 | Hull | |
| 5,247,180 A | 9/1993 | Mitcham et al. | |
| 5,248,456 A | 9/1993 | Evans, Jr. et al. | |
| 5,254,979 A | 10/1993 | Trevett et al. | |
| 5,263,130 A | 11/1993 | Pomerantz et al. | |
| 5,268,994 A | 12/1993 | Keskes | |
| 5,287,435 A | 2/1994 | Cohen et al. | |
| 5,289,214 A | 2/1994 | Zur | |
| 5,298,208 A | 3/1994 | Sibley et al. | |
| 5,306,446 A | 4/1994 | Howe | |
| 5,345,391 A | 9/1994 | Hull et al. | |
| 5,360,891 A | 11/1994 | Owen et al. | |
| 5,360,981 A | 11/1994 | Owen et al. | |
| 5,386,500 A | 1/1995 | Pomerantz et al. | |
| 5,391,072 A | 2/1995 | Lawton et al. | |
| 5,437,820 A | 8/1995 | Brotz | |
| 5,447,822 A | 9/1995 | Hull et al. | |
| 5,510,077 A | 4/1996 | Dinh et al. | |
| 5,519,816 A | 5/1996 | Pomerantz et al. | |
| 5,521,748 A | 5/1996 | Sarraf | |
| 5,529,473 A | 6/1996 | Lawton et al. | |
| 5,545,367 A | 8/1996 | Bae et al. | |
| 5,569,431 A | 10/1996 | Hull | |
| 5,571,471 A | 11/1996 | Hull | |
| 5,630,981 A | 5/1997 | Hull | |
| 5,631,763 A | 5/1997 | Park | |
| 5,651,934 A | 7/1997 | Almquist et al. | |
| 5,653,925 A | 8/1997 | Batchelder | |
| 5,753,171 A | 5/1998 | Serbin et al. | |
| 5,780,070 A | 7/1998 | Yamazawa et al. | |
| 5,823,778 A | 10/1998 | Schmitt et al. | |
| 5,858,746 A | 1/1999 | Hubbell et al. | |
| 5,876,550 A | 3/1999 | Feygin et al. | |
| 5,885,511 A | 3/1999 | Heller et al. | |
| 5,891,382 A | 4/1999 | Almquist et al. | |
| 5,894,036 A | 4/1999 | Tylko | |
| 5,897,825 A | 4/1999 | Fruth et al. | |
| 5,902,537 A | 5/1999 | Almquist et al. | |
| 5,943,235 A | 8/1999 | Earl et al. | |
| 5,945,058 A | 8/1999 | Manners et al. | |
| 5,980,813 A | 11/1999 | Narang et al. | |
| 5,991,102 A | 11/1999 | Oono et al. | |
| 6,013,099 A | 1/2000 | Dinh et al. | |
| 6,027,324 A | 2/2000 | Hull | |
| 6,030,199 A | 2/2000 | Tseng | |
| 6,048,487 A | 4/2000 | Almquist et al. | |
| 6,051,179 A | 4/2000 | Hagenau | |
| 6,078,038 A | 6/2000 | Cooper | |
| 6,124,858 A | 9/2000 | Ge et al. | |
| 6,136,252 A | 10/2000 | Bedal et al. | |
| 6,153,034 A | 11/2000 | Lipsker | |
| 6,158,946 A | 12/2000 | Miyashita | |
| 6,171,610 B1 | 1/2001 | Vacanti et al. | |
| 6,180,050 B1 | 1/2001 | Arai et al. | |
| 6,259,962 B1 | 7/2001 | Gothait | |
| 6,267,919 B1 | 7/2001 | Tanaka et al. | |
| 6,280,727 B1 | 8/2001 | Prior et al. | |
| 6,280,785 B1 * | 8/2001 | Yang | A21C 11/163 425/112 |
| 6,281,903 B1 | 8/2001 | Martin et al. | |
| 6,334,865 B1 | 1/2002 | Redmond et al. | |
| 6,352,710 B2 | 3/2002 | Sawhney et al. | |
| 6,372,178 B1 | 4/2002 | Tseng | |
| 6,391,245 B1 | 5/2002 | Smith | |
| 6,406,658 B1 | 6/2002 | Manners et al. | |
| 6,500,378 B1 | 12/2002 | Smith | |
| 6,501,483 B1 | 12/2002 | Wong et al. | |
| 6,508,971 B2 | 1/2003 | Leyden et al. | |
| 6,532,394 B1 | 3/2003 | Earl et al. | |
| 6,547,552 B1 | 4/2003 | Fudim | |
| 6,600,965 B1 | 7/2003 | Hull et al. | |
| 6,630,009 B2 | 10/2003 | Moussa et al. | |
| 6,658,314 B1 | 12/2003 | Gothait | |
| 6,660,209 B2 | 12/2003 | Leyden et al. | |
| 6,764,636 B1 | 7/2004 | Allanic et al. | |
| 6,821,473 B2 | 11/2004 | Hiizumi et al. | |
| 6,833,231 B2 | 12/2004 | Moussa et al. | |
| 6,833,234 B1 | 12/2004 | Bloomstein et al. | |
| 6,936,212 B1 | 8/2005 | Crawford | |
| 6,942,830 B2 | 9/2005 | Mulhaupt et al. | |
| 6,963,319 B2 | 11/2005 | Pate et al. | |
| 6,974,656 B2 | 12/2005 | Hinczewski | |
| 6,989,225 B2 | 1/2006 | Steinmann | |
| 7,006,887 B2 | 2/2006 | Nagano et al. | |
| 7,034,811 B2 | 4/2006 | Allen | |
| 7,048,528 B2 | 5/2006 | Ishikawa et al. | |
| 7,052,263 B2 | 5/2006 | John | |
| 7,073,883 B2 | 7/2006 | Billow | |
| 7,128,866 B1 | 10/2006 | Henningsen | |
| 7,133,041 B2 | 11/2006 | Kaufman et al. | |
| 7,183,335 B2 | 2/2007 | Napadensky | |
| 7,195,472 B2 | 3/2007 | John | |
| 7,215,430 B2 | 5/2007 | Kacyra et al. | |
| 7,225,045 B2 | 5/2007 | Gothait et al. | |
| 7,209,797 B2 | 8/2007 | Kritchman et al. | |
| 7,261,542 B2 | 8/2007 | Hickerson et al. | |
| 7,364,686 B2 | 4/2008 | Kritchman et al. | |
| 7,368,484 B2 | 5/2008 | Levy | |
| 7,403,213 B1 | 7/2008 | Morgan et al. | |
| 7,467,939 B2 | 12/2008 | Sperry et al. | |
| 7,479,510 B2 | 1/2009 | Napadensky et al. | |
| D588,701 S | 3/2009 | Sperry et al. | |
| 7,500,846 B2 | 3/2009 | Eshed et al. | |
| 7,614,866 B2 | 11/2009 | Sperry et al. | |
| 7,628,857 B2 | 12/2009 | Kritchman et al. | |
| 7,685,694 B2 | 3/2010 | Zagagi et al. | |
| 7,759,230 B2 | 7/2010 | Im | |
| 7,906,414 B2 | 3/2011 | Im | |
| 7,958,841 B2 | 6/2011 | Kritchman et al. | |
| 8,106,107 B2 | 1/2012 | Napadensky | |
| 2001/0028495 A1 | 10/2001 | Quate et al. | |
| 2001/0048183 A1 | 12/2001 | Fujita | |
| 2002/0008333 A1 | 1/2002 | Napadensky et al. | |
| 2002/0011693 A1 | 1/2002 | Leyden et al. | |
| 2002/0016386 A1 | 2/2002 | Napadensky | |
| 2002/0028854 A1 | 3/2002 | Allanic et al. | |
| 2002/0153640 A1 | 10/2002 | John | |

(56) References Cited

U.S. PATENT DOCUMENTS

| | | |
|---|---|---|
| 2002/0155189 A1 | 10/2002 | John |
| 2002/0195747 A1* | 12/2002 | Hull .................. B29C 41/12 264/401 |
| 2003/0030398 A1 | 2/2003 | Jacobs et al. |
| 2003/0067539 A1 | 4/2003 | Doerfel et al. |
| 2003/0074096 A1 | 4/2003 | Das et al. |
| 2003/0151167 A1 | 8/2003 | Kritchman et al. |
| 2003/0173714 A1 | 9/2003 | Ueno |
| 2003/0205849 A1 | 11/2003 | Farnworth |
| 2003/0207959 A1 | 11/2003 | Napadensky et al. |
| 2004/0008309 A1 | 1/2004 | Yamahara et al. |
| 2004/0027363 A1 | 2/2004 | Allen |
| 2004/0028293 A1 | 2/2004 | Allen et al. |
| 2004/0118309 A1 | 6/2004 | Fedor et al. |
| 2004/0187714 A1 | 9/2004 | Napadensky et al. |
| 2005/0023710 A1 | 2/2005 | Brodkin et al. |
| 2005/0104241 A1 | 5/2005 | Kritchman et al. |
| 2005/0192372 A1 | 9/2005 | Napadensky et al. |
| 2005/0208168 A1 | 9/2005 | Hickerson et al. |
| 2005/0248061 A1 | 11/2005 | Shkolnik et al. |
| 2005/0248062 A1 | 11/2005 | Shkolnik et al. |
| 2005/0259785 A1 | 11/2005 | Zhang |
| 2005/0288813 A1 | 12/2005 | Yang et al. |
| 2006/0054039 A1 | 3/2006 | Kritchman et al. |
| 2006/0192312 A1 | 8/2006 | Wahlstrom et al. |
| 2006/0206227 A1 | 9/2006 | Kritchman et al. |
| 2006/0239588 A1 | 10/2006 | Hull et al. |
| 2006/0249884 A1 | 11/2006 | Partanen et al. |
| 2007/0074659 A1 | 4/2007 | Wahlstrom |
| 2007/0075458 A1 | 4/2007 | Wahlstrom et al. |
| 2007/0075459 A1 | 4/2007 | Reynolds et al. |
| 2007/0075460 A1 | 4/2007 | Wahlstrom et al. |
| 2007/0075461 A1 | 4/2007 | Hunter et al. |
| 2007/0077323 A1 | 4/2007 | Stonesmith et al. |
| 2007/0078638 A1 | 4/2007 | Holmboe et al. |
| 2007/0120842 A1 | 5/2007 | Hess |
| 2007/0168815 A1 | 7/2007 | Napadensky et al. |
| 2007/0173967 A1 | 7/2007 | Kritchman et al. |
| 2007/0257055 A1 | 11/2007 | Scott et al. |
| 2007/0259066 A1 | 11/2007 | Sperry et al. |
| 2008/0038396 A1 | 2/2008 | John et al. |
| 2008/0042321 A1 | 2/2008 | Russell et al. |
| 2008/0054531 A1 | 3/2008 | Kerekes et al. |
| 2008/0105818 A1 | 5/2008 | Cohen |
| 2008/0110395 A1 | 5/2008 | Kritchman et al. |
| 2008/0118655 A1 | 5/2008 | Kritchman |
| 2008/0121130 A1 | 5/2008 | Kritchman |
| 2008/0121172 A1 | 5/2008 | Kritchman et al. |
| 2008/0124464 A1 | 5/2008 | Kritchman et al. |
| 2008/0124475 A1 | 5/2008 | Kritchman |
| 2008/0166480 A1 | 7/2008 | Kritchman et al. |
| 2008/0169586 A1 | 7/2008 | Hull et al. |
| 2008/0169589 A1 | 7/2008 | Sperry et al. |
| 2008/0170112 A1 | 7/2008 | Hull et al. |
| 2008/0179786 A1 | 7/2008 | Sperry et al. |
| 2008/0179787 A1 | 7/2008 | Sperry et al. |
| 2008/0181977 A1 | 7/2008 | Sperry et al. |
| 2008/0206383 A1 | 8/2008 | Hull et al. |
| 2008/0217818 A1 | 9/2008 | Holmboe et al. |
| 2008/0231731 A1 | 9/2008 | Hull |
| 2008/0259228 A1 | 10/2008 | Henningsen |
| 2008/0269939 A1 | 10/2008 | Kritchman |
| 2008/0309665 A1 | 12/2008 | Gregory, II |
| 2009/0105363 A1 | 4/2009 | Napadensky |
| 2009/0145357 A1 | 6/2009 | Kritchman et al. |
| 2009/0179355 A1 | 7/2009 | Wicker et al. |
| 2009/0210084 A1 | 8/2009 | Eshbed et al. |
| 2009/0304952 A1 | 12/2009 | Kritchman |
| 2010/0007696 A1 | 1/2010 | Silverbrook |
| 2010/0140850 A1 | 6/2010 | Napadensky et al. |
| 2010/0140852 A1 | 6/2010 | Kritchman et al. |
| 2010/0170540 A1 | 7/2010 | Kritchman et al. |
| 2010/0191360 A1 | 7/2010 | Napadensky et al. |
| 2010/0195122 A1 | 8/2010 | Kritchman |
| 2011/0077321 A1 | 3/2011 | Napadensky |
| 2011/0180952 A1 | 7/2011 | Napadensky |
| 2011/0241240 A1 | 10/2011 | Gothait et al. |
| 2011/0309554 A1 | 12/2011 | Liska et al. |
| 2011/0310370 A1 | 12/2011 | Rohner et al. |
| 2013/0001834 A1 | 1/2013 | El-Siblani et al. |
| 2013/0316081 A1 | 11/2013 | Kovalcik et al. |

FOREIGN PATENT DOCUMENTS

| | | |
|---|---|---|
| CN | 101918199 A | 12/2010 |
| DE | 4105314 A1 | 8/1991 |
| DE | 41 02 257 A1 | 7/1992 |
| DE | 4125334 A1 | 2/1993 |
| DE | 9319405 U | 3/1994 |
| DE | G 93 19 405.6 U1 | 5/1994 |
| DE | 43 40 108 C2 | 9/1997 |
| DE | 19716240 A1 | 10/1998 |
| DE | 19727554 A1 | 1/1999 |
| DE | 29911122 U1 | 11/1999 |
| DE | 198 38 797 A1 | 3/2000 |
| DE | 19929199 A1 | 1/2001 |
| DE | 100 03 374 C2 | 8/2001 |
| DE | 100 18 987 A1 | 10/2001 |
| DE | 201 06 887 U1 | 10/2001 |
| DE | 699 09 136 T2 | 5/2004 |
| DE | 10256672 A1 | 6/2004 |
| DE | 10 2004 022 961 A1 | 12/2005 |
| DE | 60123595 T2 | 8/2007 |
| EP | 0 250 121 A2 | 12/1987 |
| EP | 0 426 363 A2 | 5/1991 |
| EP | 0435564 A2 | 7/1991 |
| EP | 0 466 422 A1 | 1/1992 |
| EP | 0484086 A1 | 5/1992 |
| EP | 0 958 912 A1 | 11/1999 |
| EP | 2 011 631 A1 | 1/2001 |
| EP | 1 250 995 A1 | 10/2002 |
| EP | 1250997 A1 | 10/2002 |
| EP | 1 270 185 A1 | 1/2003 |
| EP | 1192041 B1 | 3/2003 |
| EP | 1156922 B1 | 6/2003 |
| EP | 1 338 846 A2 | 8/2003 |
| EP | 1637307 A2 | 3/2006 |
| EP | 1674243 A2 | 6/2006 |
| EP | 1695144 A2 | 8/2006 |
| EP | 1637307 A3 | 9/2006 |
| EP | 1274551 B1 | 10/2006 |
| EP | 1 849 587 A1 | 10/2007 |
| EP | 1847377 A2 | 10/2007 |
| EP | 1876012 A1 | 1/2008 |
| EP | 1880830 A1 | 1/2008 |
| EP | 1 894 704 A1 | 3/2008 |
| EP | 1 950 032 A2 | 7/2008 |
| EP | 1590149 B1 | 10/2008 |
| EP | 2052693 A1 | 4/2009 |
| EP | 2199068 A2 | 6/2010 |
| EP | 1741545 A3 | 9/2010 |
| EP | 2277686 A2 | 1/2011 |
| EP | 2295227 A2 | 3/2011 |
| EP | 2298540 A2 | 3/2011 |
| EP | 2011631 B1 | 4/2012 |
| FR | 2 254 194 A5 | 7/1975 |
| FR | 2 853 334 A1 | 12/1986 |
| FR | 2 634 686 A1 | 2/1990 |
| FR | 2 692 053 A1 | 12/1993 |
| GB | 2311960 A | 10/1997 |
| HK | 01089128 | 7/2009 |
| JP | 04371829 A | 12/1992 |
| JP | 08150662 | 6/1996 |
| JP | 08192469 A | 7/1996 |
| JP | 2003321704 A | 11/2003 |
| JP | 2011500382 A | 1/2011 |
| WO | 9511007 A1 | 4/1995 |
| WO | 9515841 A1 | 6/1995 |
| WO | 9600422 A1 | 1/1996 |
| WO | 0021735 A1 | 4/2000 |
| WO | 0100390 A1 | 1/2001 |
| WO | 0112679 A1 | 2/2001 |
| WO | 0172501 A1 | 10/2001 |
| WO | 0227408 A2 | 4/2002 |

(56) References Cited

FOREIGN PATENT DOCUMENTS

| WO | 03059184 A2 | 7/2003 |
|---|---|---|
| WO | 2005110722 A1 | 11/2005 |
| WO | 2008120183 A1 | 10/2008 |
| WO | 2009013751 A2 | 1/2009 |
| WO | 2009053099 A1 | 4/2009 |
| WO | 2009053100 A1 | 4/2009 |
| WO | 2009125381 A1 | 10/2009 |
| WO | 2010045950 A1 | 4/2010 |
| WO | 2010045951 A1 | 4/2010 |
| WO | 2012021940 A1 | 2/2012 |

OTHER PUBLICATIONS

K. Takahashi, "A New Application of DMD to Photolithography and Rapid Prototyping System," Institute of Electronics, Information, and Communication Engineers.
IEEE Super Resolution article abstract vol. 20, issue 3, pp. 21-36, May 2003.
37 CFR 1.99 Submission and declaration.
Htt:I/www.hp.com/hpinfo/newsroom/press/2004/040609a.html "HP technology doubles the resolution of digital projection displays" Jun. 9, 2004.
4 W. Allen, R. Ulichney "Wobulation: Doubling the Addressed Resolution," SID 05 Digest, 2005.
Wobulation, saved as PDF from the internet; wikipedia definition, citing several resolution-relate patents.
*3D Systems, Inc. v. Envisiontec, Inc., et al.* Special Masters Report and Recommendation on the Parties' Summary Judgement Motions.
International Search Report (German Translation) for PCT/EP2005/005003.
International Preliminary Report on Patentability for PCT/EP2008/009041, dated Apr. 27, 2010.
Written Opinion of the International Searching Authority for PCT/EP2008/009041, dated Apr. 27, 2007.
International Search Report for PCT/EP2008/009040, dated Feb. 4, 2009.
Stark, G.B., et al., "Biological Matrices and Tissue Reconstruction," Springer Publications, Berlin (1998).
Sachs, E., et al., "Three Dimensional Printing: Rapid Tooling and Prototypes Directly from CAD Model," Journal of Engineering for Industry, 114:481-488 (1992).
Kuhtreiber, W., Ph.D., et al., "Cell Encapsulation Technology and Therapeutics," Birkhauser, Boston (1998).
Landers, R., and Mulhaupt, R., "Desktop Manufacturing of Complex Objects, Prototypes and Biomedical Scaffolds by means of Computer-Assisted Design Combined with Computer-Guided 3D Plotting of Polymers and Reactive Oligomers," Macromolecular Materials and Engineering, 282:17-22 (2000).
Okada, T., and Ikada, Y., "Tissue Reactions to Subcutaneously Implanted, Surface-Modified Silicones," Journal of Biomedical Materials Research, 27:1509-1518 (1993).
Relou, I.A., et al., "Effect of Culture Conditions on Endothelial Cell Growth and Responsiveness," Tissue & Cell, 30 (5):525-538 (1998).
Nikolaychik, V.V., et al., A New, Cryoprecipitate Based Coating for Improved Endothelial Cell Attachment and Growth on Medical Grade Artificial Surfaces:, ASAIO Journal, 40:M846-M852 (1994).
Bums, "Automatic Fabrication Improving Productivity in Manufacturing", 1993 (ISBN 0-13-119462-3).
Opposition to EP 1,849,587, dated Apr. 8, 2010.
C. Sun, et al., "Projection Micro-Stereolithography Using Digital Micro-Mirror Dynamic mask," Sensors and Actuators A 121 (2005) 113-120.
S. Ventura, et al., "Freeform Fabrication of Functional Silicon Nitride Components by Direct Photoshaping," Mat. Res. Sol. Symp. Proc., vol. 625 (2000).
Written Opinion of the International Searching Authority for PCT/EP2008/009040, dated Feb. 4, 2009.
Huang, et al., "Computer Supported Force Analysis and Layer Imagine for Masked Rapid Prototyping System" Department of Mechanical Engineering, National Taiwan University of Science and technology, Taipei, Taiwan.
Huang, et al., "On-line force monitoring of platform ascending rapid prototyping system" Journal of Materials Processing Technology 159 (2005) 257-264.
European Patent Office (EPO) Notice of Opposition, dated Feb. 25, 2013.
Opposition to EP 2 011 631, dated Jan. 14, 2013.
English translation of DE10018987 from Lexis Nexis Total Patent.
English translation of 19727554 from Lexis Nexis Total Patent.
English translation of 69909136 from Lexis Nexis Total Patent.
English translation of DE29911122 from Lexis Nexis Total Patent.
English translation of CN1769032A, from Lexis Nexis Total Patent.
English translation of CN101918199A, from Lexis Nexis Total Patent.
English translation of DE10256672A1, from Lexis Nexis Total Patent.
English translation of JP 2003321704A, from Lexis Nexis Total Patent.
Patent Abstracts of Japan, English Translation of JP 08-150662, from http://www19.ipdl.inpit.go.jp/PA1/resultmainwoYeaMaDA408150662P1.htm2011/07/15.
English translation of DE 19929199 from Lexis Nexis Total Patent.
English translation of DE 10256672 from Lexis Nexis Total Patent.
English abstract of JP 2011500382A, from Lexis Nexis Total Patent.
International Search Report and Written Opinion for PCT/US2012/044398, dated Oct. 26, 2012.
Yamazawa, Kenji, et al., "High Speed UV Laser Beam Scanning by Polygon Mirror," pp. 223-230, The Institute of Physical and Chemical Research (Riken), (1997).
English translation for CN101898423 from Lexis Nexis Total Patent.
English translation for WO2010045951A from Lexis Nexis Total Patent.
English translation for WO2010045950 from Lexis Nexis Total Patent.
English translation for DE60123595 from Lexis Nexis Total Patent.
English translation for DE 9319405 from Lexis Nexis Total Patent.
Document 1-4 for Complaint Cover Sheet, *Objet Geometries, Ltd. v. 3D Systems, Inc.*, Case 0:5-cv-00136-JRT-FLN.
Complaint, *Objet Geometries, Ltd. v. 3D Systems, Inc.*, Case 0:5-cv-00136-JRT-FLN.
Document 1-1 for Complaint, *Objet Geometries, Ltd. v. 3D Systems, Inc.*, Case 0:5-cv-00136-JRT-FLN.
Document 1-2 for Complaint, *Objet Geometries, Ltd. v. 3D Systems, Inc.*, Case 0:5-cv-00136-JRT-FLN.
Document 1-3 for Complaint, *Objet Geometries, Ltd. v. 3D Systems, Inc.*, Case 0:5-cv-00136-JRT-FLN.
English abstract for AU4104501A.
English abstract for AU2003286397A1, from Lexis Nexis Total Patent.
International Search Report and Written Opinion dated, May 21, 2012 for PCT/US2012/023166.
International Search Report and Written Opinion dated, May 26, 2016 for PCT/US2015/014726.

\* cited by examiner

APPARATUS AND METHOD FOR FORMING THREE-DIMENSIONAL OBJECTS FROM SOLIDIFIABLE PASTE

FIELD

The disclosure relates to an apparatus and method for manufacturing three-dimensional objects, and more specifically, to an apparatus and method for manufacturing such objects from a solidifiable paste.

DESCRIPTION OF THE RELATED ART

Three-dimensional rapid prototyping and manufacturing allows for quick and accurate production of components at high accuracy. Machining steps may be reduced or eliminated using such techniques and certain components may be functionally equivalent to their regular production counterparts depending on the materials used for production.

The components produced may range in size from small to large parts. The manufacture of parts may be based on various technologies that solidifying solidifiable materials into a hardened three-dimensional object. Certain technologies use photo-polymer hardening using light or laser curing methods. Secondary curing may take place with exposure to, for example, ultraviolet (UV) light. A process to convert a computer aided design (CAD) data to a data model suitable for rapid manufacturing may be used to produce data suitable for constructing the component. Then, a pattern generator may be used to construct the part. An example of a pattern generator may include the use of DLP (Digital Light Processing technology) from Texas Instruments®, SXRD™ (Silicon X-tal Reflective Display), LCD (Liquid Crystal Display), LCOS (Liquid Crystal on Silicon), DMD (digital mirror device), J-ILA from JVC, SLM (Spatial light modulator) or any type of selective light modulation system. One technique that may be used to form a three-dimensional object involves the use of a linear solidification device.

In certain applications, it is desirable to form three-dimensional objects from a solidifiable paste, such as a highly viscous resin, a semi-solid, a gel, or a blend of such materials with wax, or metal, or ceramic fillers. Such applications include the formation of dental appliances such as arches, crowns, or orthodontic appliances. Unlike low or medium viscosity materials, solidifiable pastes typically do not flow due to the force of gravity alone. Thus, when a layer of the paste is solidified, it creates a depleted area of solidifiable paste. If some means is not provided for replenishing the depleted paste, insufficient paste may be available to form the next or subsequent object layers. In certain investment casting processes, a solidifiable paste is provided which comprises a wax filler and a polymeric binder. However, in known processes of solidifying such solidifiable pastes, the amount of wax in the solidifiable paste has been limited to no greater than 25 percent because of the inability to replenish the depleted paste. In general, it is preferable to increase the amount of wax filler for easier casting. Thus, this limit is generally undesirable.

The problem of replenishing depleted areas of solidifiable paste may be particularly acute when using "upside down" build processes. Certain methods of manufacturing three-dimensional objects have been developed wherein a build platform descends as a three-dimensional object is progressively built upward in a direction away from the build platform. These processes may be termed "right-side up" processes because the orientation of the object during the build process is the same as the orientation of the finished object when in use. In right-side up processes, synergistic stimulation to convert the solidifiable paste to a three-dimensional object is generally applied in a downward direction onto the exposed surface of the solidifiable paste. In certain known "right-side up" build processes, the solidifiable object is progressively immersed into the paste during solidification. In order to provide a homogeneous layer of paste to solidify an object layer, the build platform may be dropped by an amount greater than the layer thickness and then brought upward. This action tends to break up bubbles and replenish depleted areas of solidifiable paste.

"Upside down" build processes differ from "right-side up" processes in that a build platform is suspended upside down and progressively moves upward as the three-dimensional object is progressively built in a downward direction. These types of methods may be termed "upside down" processes because during the object building process the object is oriented upside down relative to the orientation of the finished object as designed and when in use. In certain known upside down processes, a volume of solidifiable material is provided in a tray or basin with a closed bottom. During the formation of each object layer, the build platform is positioned so that the exposed (downward facing) surface of the last formed object layer is spaced apart from the bottom of the closed tray by a desired layer thickness. In the case of low or medium viscosity liquids, this typically does not present a problem because the action of gravity will cause the volume of solidifiable material to flow into regions that were previously depleted due to the formation of solidified object sections, thus providing a homogeneous volume of solidifiable material for the next layer formation step. However, this is not the case with solidifiable pastes. Known upside down build processes are not configured to replenish depleted solidified paste regions in a volume of solidifiable paste. As a result, a need has arisen for an apparatus and method that addresses the foregoing concerns.

BRIEF DESCRIPTION OF THE DRAWINGS

The disclosure will now be described, by way of example, with reference to the accompanying drawings, in which.

Like numerals refer to like parts in the drawings.

DETAILED DESCRIPTION

Figure 1:
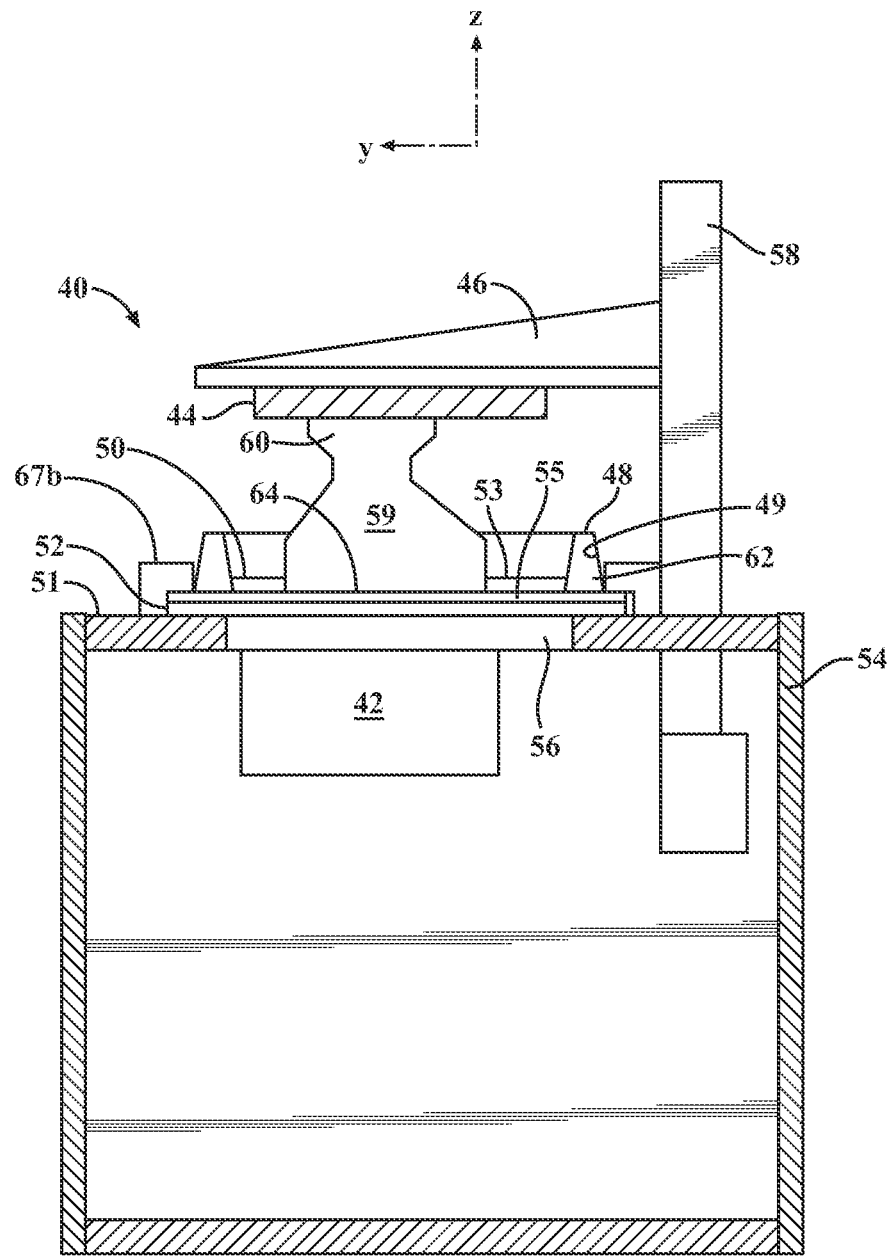
FIG. 1 is a side elevation view of an apparatus for making a three-dimensional object in an upside down build process used with low or medium viscosity solidifiable materials.

The Figures illustrate examples of an apparatus and method for manufacturing a three-dimensional object from a solidifiable paste. Based on the foregoing, it is to be generally understood that the nomenclature used herein is simply for convenience and the terms used to describe the invention should be given the broadest meaning by one of ordinary skill in the art.

The apparatuses and methods described herein are generally applicable to additive manufacturing of three-dimensional objects, such as components or parts (discussed herein generally as objects), from a solidifiable paste. As used herein, the term "paste" refers to a thick, viscous material that is spreadable but which is not deformable under gravity alone. The term "solidifiable paste" refers to a paste that is transformable from a spreadable state to a hardened, non-spreadable state due to the application of solidification energy such as electromagnetic radiation. In certain preferred examples, the solidifiable pastes described herein are photohardenable compositions that solidify in response to invisible or visible light. The photohardenable compositions typically include a photoinitiator that initiates polymerization and/or cross-linking in response to electromagnetic radiation of a particular wavelength or range of wavelengths. Certain photoinitiators are "free radical" initiators that generate free radicals to initiate the polymerization and/or cross-linking process. Other photoinitiators are "cationic" photoinitiators that generate cations to initiate the polymerization and/or cross-linking process.

The solidifiable pastes described herein are preferably highly viscous and have a viscosity of at least about 10,000 centipoise (cp), preferably at least about 15,000 cp, more preferably at least about 20,000 cp, still more preferably at least about 50,000 cp, even more preferably at least about 60,000 cp, more preferably at least about 70,000 cp, yet more preferably at least about 80,000 cp, even more preferably at least about 90,000 cp, and still more preferably at least about 100,000 cp. In certain examples, the solidifiable pastes described herein have viscosities of at least about 150,000 cp, at least about 200,000 cp, at least about 300,000 cp, at least about 400,000 cp, at least about 500,000 cp, at least about 600,000 cp, at least about 700,000 cp, at least about 800,000 cp, at least about 900,000 cp, at least about 1,000,000 cp, or at least about 2,000,000 cp. At the same time, the solidifiable pastes described herein preferably have a viscosity that is no greater than about 100,000,000 cp, no greater than about 90,000,000 cp, no greater than about 80,000,000 cp, no greater than about 70,000,000 cp, no greater than about 60,000,000 cp, no greater than about 50,000,000 cp, no greater than about 40,000,000 cp, no greater than about 30,000,000 cp, no greater than about 20,000,000 cp, or no greater than about 10,000,000 cp.

The solidifiable pastes described herein may comprise a gel, a cream, a glue, an adhesive, and/or a semi-solid. The solidifiable pastes may comprise polymeric components and non-polymeric components. The polymeric component may comprise a binder with or without fillers. Suitable binders include polymers, copolymers, terpolymers, block copolymer, or blends of any of the foregoing. The binder may be uncross-linked or partially cross-linked. Accordingly, suitable polymers for the binder component include, but are not limited to: acrylate and/or methacrylate containing compounds, for example mono-, di-, tri-, tetra-, pentacrylate, such as alkyl- or alkoxy-(meth)acrylates, (meth)acrylic esters having short or long chain alkyl ester groups, e.g. alkyl glycol di(meth)acrylate; epoxy group containing compounds; vinyl group containing or vinyl ether group containing compounds; polysiloxanes; and the like, as well as mixtures thereof. Alternatively, a thermal hardening polymer substance such as an epoxy group containing compound may be used, which is preferably protected with an amine group that decomposes in response to light and/or heat. At least a portion of the polymeric component is solidifiable in response to appropriate synergistic stimulation, such as electromagnetic radiation of a wavelength suitable to initiate polymerization and/or cross-linking. However, the polymeric component may also include crosslinked or un-cross-linked polymers as fillers that do not further polymerize or cross-link in response to the applied synergistic stimulation.

The binder may also include non-polymeric, auxiliary agents used to facilitate polymerization and/or cross-linking, including but not limited to: photoinitiators, which may be selected depending on the desired wavelength of electromagnetic and/or synergistic radiation, such as 2-benzyl-2-dimethylamino-1(4-morpholino phenyl)butanone, 1,2,2'-dimethoxy-2-phenylacetophenol, bisimidazoles, benzophenones, α-aminoketones, xanthenes, fluorenes, fluorones, ferrocenes, and the like; co-initiators and/or activation agents such as thioxanthones (e.g. isopropyl thioxanthonel-chloro-4-propoxythioxanthone), 4-benzoyl-4'-methyldiphenyl sulfide, ethyl-p-dimethylaminobenzoate, N,N-dialkyl-toluidine or -aniline, benzophenones, diaryliodo compounds, borates, phosphites, and the like.

A filler which may be mixed with a binder for providing a solidifiable paste typically is a solid or substantially solid substance and may include, without being limited to: a ceramic substance such as e.g. alumina, magnesia, zirconia, ceramic oxides of other transition metals such as titania, hafnium oxide, rare earth metal oxides, spinel type double metal oxide ceramics, or mixtures thereof; cermets; silicate, aluminosilicate, apatite, fluoroapatite, hydroxylapatite, phosphates such as tricalcium phosphate, calcium magnesium phosphate, calcium ammonium phosphate, mullite, spinels, and mixtures thereof; glass materials, such as silicate glass, borsilicate glass, quartz glass and mixtures thereof; carbon black; pigments; metals and metal alloys such as stainless steel, titanium or titanium alloy, nickel alloy, copper or copper alloy such as brass (70% copper and 30% zinc), aluminum or aluminum alloy, iron or iron alloy and mixtures thereof; solid polymers or polymer blends such as polymerized acrylic resins and blends or copolymers thereof like polyurethane/polyacrylates, acrylonitrile/butadiene/styrene-polymerisates (ABS), epoxides and copolymers thereof, nylon and blends or copolymers thereof, polyamid elastomers and mixtures thereof, and other filler substances, including waxes.

Ceramic fillers are particularly beneficial for dental applications in terms of achieving high mechanical strength at good homogeneity combined with high size accuracy (especially when the process includes post-treatment such as sintering and thereby a transformation from a first to a second circumferential size). Exemplary ceramic fillers include powders comprising ceramic materials selected from alumina, zirconia, or a mixture thereof. A particularly preferred ceramic powder comprises a ceramic material selected from monoclinical or non-monoclinical zirconia, yttria-doped or -stabilized tetragonal monoclinical or non-monoclinical, single or non-single phased zirkonia (i.e. $ZrO_2$ containing 3-5 mol-% $Y_2O_3$), especially 3YTZP.

The filler component may further comprise one or more kinds of additives, for example but not limited to dispersants, coloring agents such as pigments, post-treatment auxiliary additives such as sintering aids or stabilizers, etc. The filler may co-fuse or co-sinter itself under the action of electromagnetic radiation and/or synergistic stimulation used for solidification (e.g. especially when polymer fillers are used). It is on the other hand preferred that the filler itself is inert with respect electromagnetic radiation and/or synergistic stimulation at a level which solidifies the binder admixed with the filler, but may nevertheless co-fuse or co-sinter in a post-treatment described later (e.g. when ceramics, glass or metals/metal alloys are used).

The filler may be in the form of particles, a powder, fibers, a net, a scaffold, and the like. The particularly preferred particulate form of the filler is a powder having a suitable particle size, preferably being spherical or essentially spherical in shape, and further preferably having a mean particle size in a range of about 0.001 microns to 100 microns, more preferably in a range of about 0.01 to 50 microns and particularly in a range of about 0.1 to 10 microns. As to the distribution of the absolute particle size of the filler, it may range from about 1 nm to 1000 microns or higher, more preferably from about 0.1 microns to 100 microns. The filler may have a monomodal, a bimodal or a trimodal size distribution, using the same or different filler materials. Solidifiable pastes described herein may also include rheology adjusting agents, viscosity adjusting agents, diluents, solvents, colorants such as dyes and/or color pigments, thixotropic agents, thickeners, stabilizers, coupling agents, wetting agents, dispersants, lubricants, adhesives, pore forming agents, and the like, respectively alone or in combination.

In certain preferred examples, the solidifiable pastes described herein are used for investment casting and comprise a wax powder filler with a polymeric binder that solidifies in response to solidification energy. The amount of wax by weight of the solidifiable paste is preferably greater than 25 percent, more preferably at least about 30 percent, still more preferably at least about 40 percent, and even more preferably, at least about 50 percent. In certain preferred examples, the solidifiable paste comprises a wax powder and a polymeric binder, and the percentage by weight of solidifiable paste of the wax powder is from about 50 percent to about 60 percent. In one example of a solidifiable paste comprising a wax powder and a polymeric binder, a Microease 114S synthetic wax powder supplied by Micro Powders, Inc. of Tarrytown, N.Y. is combined with a PIC 100 Photopolymer supplied by Envisiontec, Inc. of Dearborn, Mich. to form a paste comprising 50 to 60 percent by weight of the Microease 114S and 40 to 50 percent by weight of the PIC100 photopolymer. In another example, the Microease 114S is combined with a EC500 photopolymer supplied by Envisiontec to form a solidifiable paste comprising 50 to 60 percent by weight of the Microease 114S and 40 to 50 percent by weight of the EC500. In another example of a solidifiable paste comprising 50 percent by weight of the Microease 114S and 50 percent by weight of PIC100, the solidifiable paste has a resulting viscosity of from about 1,000,000 cp to about 2,000,000 cp.

In accordance with a first example of an apparatus for making a three-dimensional object from a solidifiable paste, the apparatus comprises a source of solidification energy, a solidifiable paste container, and a build platform. The solidifiable paste container has an open top and a closed bottom and contains a solidifiable paste that solidifies in response to solidification energy provided by the source of solidification energy. The solidifiable paste container is located between the source of solidification energy and the build platform. During an object building process, the build platform moves along a build axis away from the solidifiable paste container to progressively build the three-dimensional object along the build axis. In certain implementations, the apparatus includes a solidifiable paste spreader, which may be provided as part of a paste spreader assembly.

FIG. 1 illustrates a system 40 for making a three-dimensional object using low or medium viscosity solidifiable materials other than solidifiable pastes. The system 40 is an "upside-down" system in which three-dimensional object 59 is built upside down. When three-dimensional object 59 is removed from build platform 44, the build-platform contacting surface 60 of object 59 will be oriented beneath the top surface of the object. The subsequent figures provide modifications to the basic system of FIG. 1 which include solidifiable paste spreaders and/or solidifiable paste spreader assemblies. System 40 includes a housing 54 used to support a solidifiable material container 48, a linear solidification device 42, and a build platform 44.

In the example of FIG. 1, the solidification energy source is provided in a pattern generator comprising linear solidification device 42. Linear solidification device 42 scans adjacent linear patterns of solidification energy along one axis (the y-axis) while moving along another axis (the x-axis). Suitable linear solidification devices 42 include a source of solidification energy and a linear scanning device. In one example, a linear solidification device 42 includes a laser diode that projects solidification energy onto a rotating polygonal mirror comprising a plurality of facets. The rotating polygonal mirror acts as a linear scanning device. As the solidification energy progressively traverses the length of a given facet due to the rotation of the mirror, the facet deflects solidification energy in a linear pattern along a surface of the solidifiable paste that is in contact with the closed bottom of solidifiable material container 48. Other suitable linear solidification devices 42 comprise a laser diode that projects solidification energy to laser scanning micromirrors such as magnetically-actuated MOEMS (micro-optical-electromechanical systems). Examples of linear solidification devices are described in FIGS. 3, 4, and 5A-5D of Applicant's co-pending U.S. patent application Ser. No. 13/534,638, filed on Jun. 27, 2012 and the corresponding text, including at paragraphs 60-79 and 86-104, the contents of which are hereby incorporated by reference. Pattern generators other than linear solidification devices may also be used with system 40. Exemplary pattern generators other than linear solidification devices which may be used include DLP (Digital Light Processing technology) from Texas Instruments®, SXRD™ (Silicon X-tal Reflective Display), LCD (Liquid Crystal Display), LCOS (Liquid Crystal on Silicon), DMD (digital mirror device), J-ILA from JVC, SLM (Spatial light modulator) or any type of selective light modulation system. Pattern generators that "draw" laser energy in two-dimensionally varying patterns across an exposed surface of solidifiable material may also be used, such as those that comprise a laser in optical communication with x The pattern generator supplies energy patterns that correspond to object data representative of the three-dimensional object to the solidifiable material so that the solidifiable material solidifies in a shape that also corresponds to the object data. In the case of spatial light modulators, the energy patterns are typically defined by the ON or OFF states or gray scale or color values of a plurality of imaging elements that spatially correspond to different locations on the exposed surface of the solidifiable material. In the case of linear solidification devices, the energization state of a solidification energy source (such as a laser diode) relative to a position and/or other temporally varying characteristics of a linear scanning device. For example, with linear solidification devices that are configured as a laser diode in optical communication with a rotating polygonal mirror, the pattern of energy supplied to the exposed surface of the solidifiable material will be determined by the position of the linear solidification device along a travel axis, the state of the laser (ON or OFF), and the rotational position of the rotating polygonal mirror.

Referring still to FIG. 1, solidifiable material container 48 comprises sidewalls 62 and a bottom that comprises a rigid or semi rigid solidification substrate 52 that is transparent and/or translucent with a transparent and/or translucent film 55 coating adhered to its upper surface. As mentioned previously, the system of FIG. 1 is preferably used with low or medium viscosity materials other than solidifiable pastes. During an object forming operation, the exposed surface 64 of the partially-formed three-dimensional object 59 is immersed beneath the exposed surface 53 of solidifiable material 50. Although the spacing is not visible in FIG. 1, the exposed object surface 64 is preferably immersed such that it is spaced apart along the build (z) axis from the film 55, which along with rigid or semi-rigid, transparent and/or translucent solidification substrate 52 defines the closed-bottom of the solidifiable material container 48. The z-axis spacing (Δz) is the layer thickness of solidifiable material used to form the next solidified object layer. Once the exposed object surface 64 is positioned at the desired layer thickness from the film 55/substrate 52, solidification energy is supplied from a pattern generator, such as linear solidification device 42. The solidifiable material within the layer thickness then solidifies in a pattern that corresponds to the solidification energy pattern provided by the pattern generator.

Once the solidified object layer is formed, the exposed surface 64 of the solidified object 59 will be in contact with film 55. The operation of elevator 58 pulls the build platform 44 upward to create space for the next object layer. Due to the solidification process, a portion of the volume of solidifiable material 50 in solidifiable material container will be depleted. In the case of low and medium viscosity materials, the remaining solidifiable material 50 in solidifiable material container 48 will readily flow into the depleted area to create a homogeneous volume of solidifiable material 50, which in turn provides an even layer thickness of solidifiable material between the exposed object surface 64 and the film 55. However, in the case of solidifiable pastes, the depleted zones will not be filled because gravity forces will be insufficient to cause the paste to flow into the depleted zones.

Figure 2:
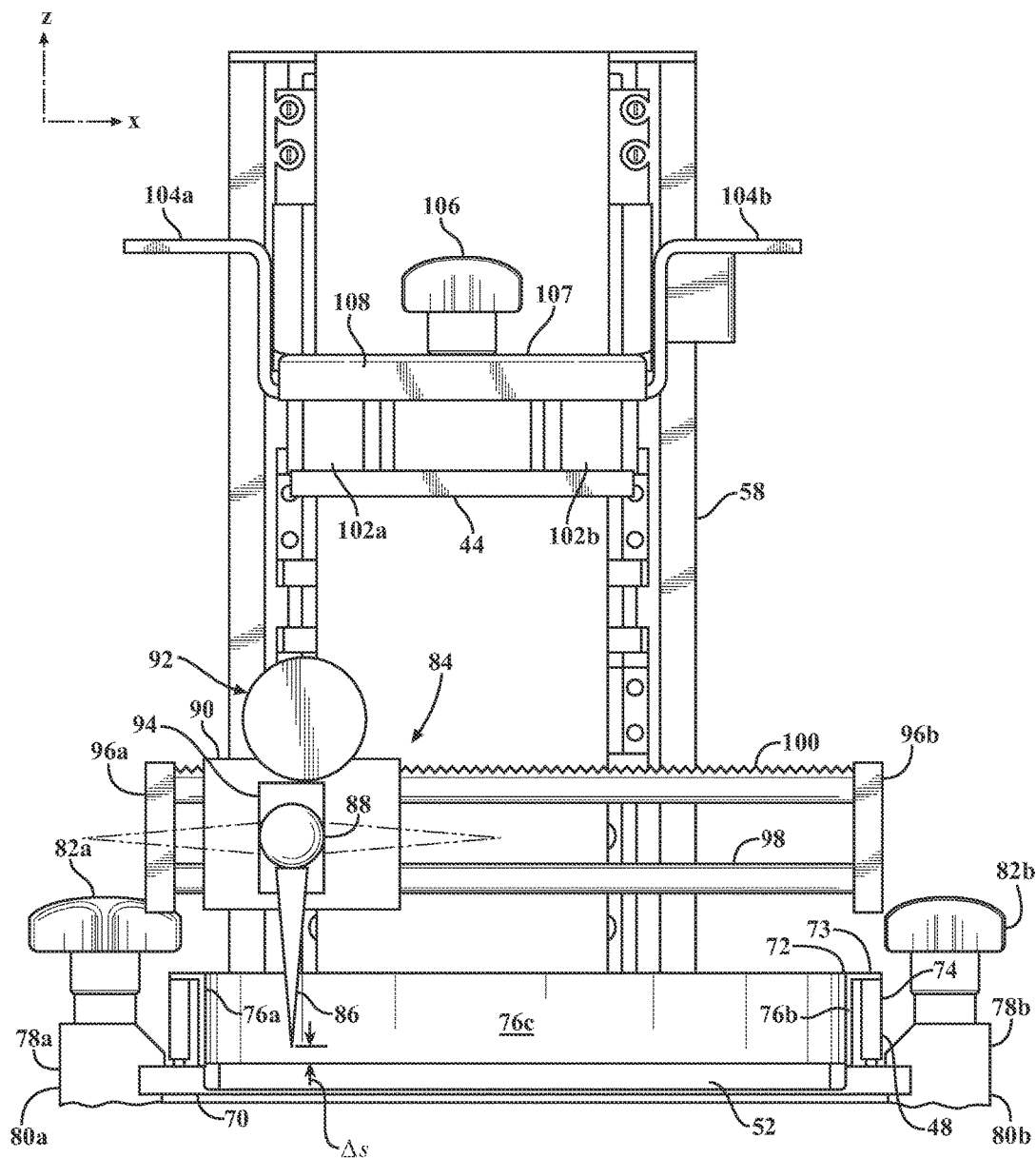
FIG. 2 is a front elevational view of an apparatus for making a three-dimensional object from a solidifiable paste in an upside down build process, wherein the apparatus includes a first exemplary paste spreader assembly.
Figure 3:
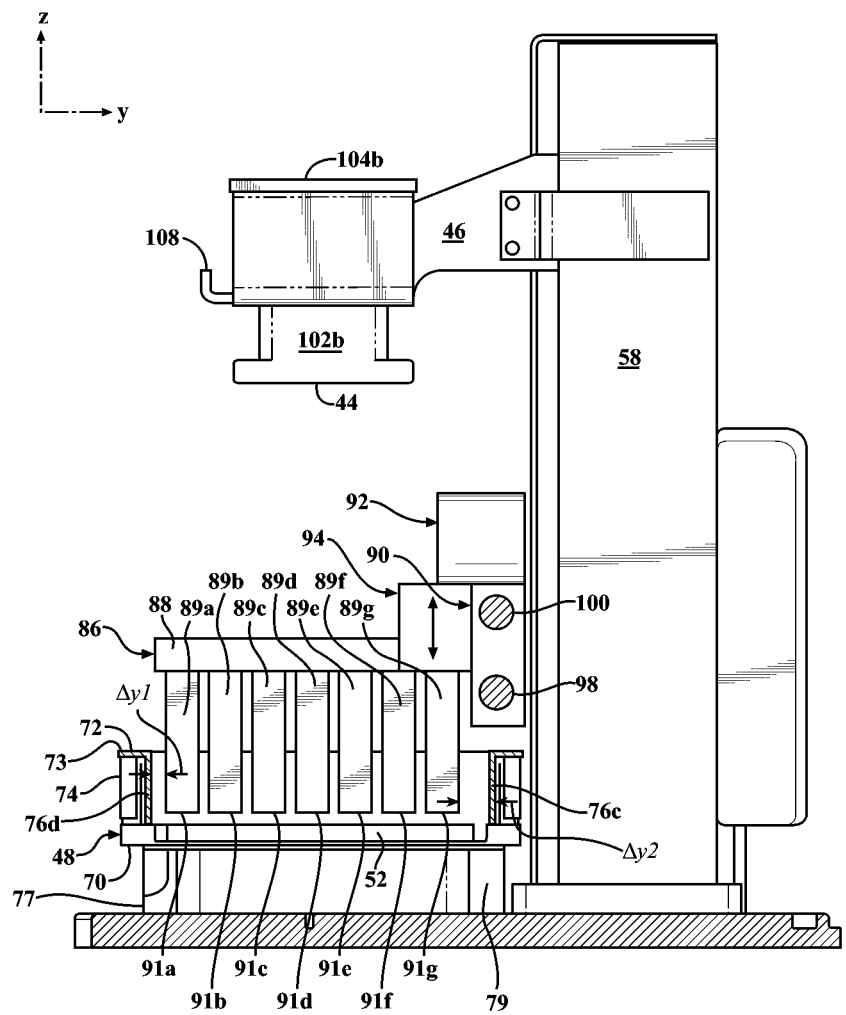
FIG. 3 is a side elevational view of the apparatus of FIG. 2.

FIGS. 2 and 3 depict a first modified version of the system 40 FIG. 1. Unlike the system 40 of FIG. 1, the system of FIGS. 2 and 3 includes a solidifiable paste container 48 and a paste spreader assembly 84. For ease of illustration, the solidifiable paste is not shown in FIGS. 2-3. However, a volume of the paste would be included in the solidifiable paste container 48.

In the system of FIGS. 2 and 3, solidifiable paste container 48 comprises a rigid or semi-rigid, transparent and/or translucent solidification substrate 52, a base 70, and a frame assembly comprising an inner frame 72 and an outer frame 74. Inner frame 72 is generally rigid (e.g., plastic or metal) and comprises four side walls 76a-76d (wall 76(d) is not shown in FIG. 2 for ease of viewing) Inner frame 72 also has a horizontal lip 73 that projects outwardly away from the interior space defined by side walls 76a-76d in a direction parallel to the x-y plane. Outer frame 74 is also generally rigid (plastic or metal) and comprises four vertical walls (not labeled for ease of viewing). Inner frame 72 and outer frame 74 define a frame assembly. In an installed condition, the horizontal lip 73 of inner frame 72 fits over the top surface of outer frame 74 to define the upper surface of the frame assembly and the upper surface of solidification paste container 48. A plurality of fasteners (not shown) project through horizontal lip 73 and engage corresponding holes (not shown) formed in the upper surface of outer frame 74 to secure the inner frame 72 to the outer frame 74. In one example, base 70 is connected to outer frame 74 such as by a plurality of screws or other fasteners. The frame assembly of FIGS. 2-3 is illustrated in greater detail in FIGS. 5-8 and paragraphs 82-88 of Applicant's co-pending U.S. patent application Ser. No. 13/361,803, filed Jan. 30, 2012, the contents of which are hereby incorporated by reference.

Rigid or semi-rigid, transparent and/or translucent solidification substrate 52 is connected to base 70 such as by an adhesive applied around the inner perimeter of base 70 and/or the outer perimeter of substrate 52. In the example of FIG. 8 of U.S. patent application Ser. No. 13/361,803, the lower surface of substrate 52 is disposed above the lower surface of base 70 to prevent damaging substrate 52 when base 70 is placed on a table or other surface such as during maintenance activities. Solidification substrate 52 is generally rigid or semi-rigid and substantially permeable to the energy supplied by linear solidification device 42 (or whatever type of pattern generator is provided). In certain examples, it is preferred that the energy from linear solidification device 42 can pass through solidification substrate 52 without a significant diminution in transmitted energy or a significant alteration of the energy pattern or spectrum transmitted to the solidifiable paste relative to the pattern and spectrum of the radiation that is incident to the lower surface of solidification substrate 52. In the case where the energy provided by linear solidification device 42 or another kind of pattern generator is a light pattern (including non-visible light such as UV light), solidification substrate 52 is preferably substantially transparent and/or translucent to the wavelengths of light supplied by the linear solidification device 42 or other pattern generator. As energy is supplied to the surface of the solidifiable paste that is in contact with solidification substrate 52, the paste will begin to solidify in accordance with the energy pattern supplied by the linear solidification device 42 or other type of pattern generator.

One example of a rigid or semi-rigid solidification substrate 52 is a transparent and/or translucent float glass. Another example is a transparent and/or translucent plastic. A variety of different float glasses and plastics may be used. Exemplary plastics that may be used include transparent acrylic plastics supplied by Evonik under the name ACRYLITE®. Substrate 52 is preferably rigid enough to provide a substantially planar surface of solidifiable paste at the substrate 52 when solidification energy is projected through the substrate 52. The term "transparent" is meant to indicate that substrate 52 is capable of transmitting the light wavelengths (including non-visible light such as UV light if supplied by linear solidification device 42) necessary to solidify the solidifiable paste and that neither the intensity of such wavelengths nor the geometry of the energy pattern is significantly altered as the light passes through substrate 52. In certain examples, the solidifiable material container 48 is tiltable relative to object build platform 44 platform and an object section formed thereon (e.g., object 59 in FIG. 1) to facilitate peeling of exposed object surface 64 from rigid or semi-rigid, transparent and/or translucent solidification substrate 52.

In certain embodiments, the solidifiable paste may adhere strongly to the solidification substrate 52 when solidified, causing the object 59 (FIG. 1) to break or deform when build platform 44 moves away from linear solidification device 42 along the build (z) axis during an object building operation. Thus, in certain examples, a solidification substrate assembly comprising both a rigid or semi-rigid transparent and/or translucent solidification substrate and one or more films is provided. In one example, and as shown in FIG. 8 of U.S. application Ser. No. 13/361,803, a single film is provided adjacent solidification substrate 52. In some examples, the film is resilient, while in others a resilient film is not required. Suitable resilient films include silicone elastomers. One particular example of a suitable silicone elastomer is ELASTOSIL® RT 601, which is supplied by Wacker Silicones. ELASTOSIL® RT 601 is a transparent, addition-curing silicone rubber having greater than 88 percent transmission of light in the 325-700 nm range (for a 10 mm layer). The material has an elongation at break of about 100 percent (ISO 37), and a tensile strength of about 7.0 N/mm$^2$ (DIN ISO 37) tear strength (ASTM D 624B) of about 3.0 N/mm$^2$. Suitable non-resilient films include homopolymers or copolymers formed from ethylenically unsaturated, halogenated monomers, such as fluoropolymers. Examples of suitable non-resilient films include polyvinylidene fluoride (PVDF), ethylenchlorotrifluoroethylene (ECTFE), ethylenetetrafluoroethylene (ETFE), polytetrafluoroethylene (PTFE), perfluoroalkoxy (PFA), and modified fluoroalkoxy (a copolymer of tetrafluoroethylene and perfluoromethylvinylether, also known as MFA). Other suitable films include PVDF films sold under the KYNAR® name by Arkema, ECTFE films sold under the HALAR® name by SolvaySolexis, ETFE films sold under the TEFZEL® name by DuPont, PFA films sold under the TEFLON®—PFA name by DuPont, and MFA films sold under the name NOWOFOL®.

A variety of combinations of films and configurations may be used to create a suitable solidification substrate assembly. In one example, a rigid or semi-rigid transparent and/or translucent solidification substrate is attached to a resilient film, such as a silicone film. In another example, a rigid or semi-rigid transparent and/or translucent solidification substrate is attached to a resilient film which is in turn attached to a non-resilient film, such as an MFA film. In yet another example, a rigid or semi-rigid transparent and/or translucent solidification substrate is attached to a resilient film and a loose non-resilient film is provided between the resilient film and the rigid or semi-rigid, transparent and/or translucent solidification substrate.

As an alternative to the structure depicted in FIG. 2, solidifiable material container 48 may comprise a basin formed from polymeric materials. In one example, a basin comprising a transparent and/or translucent resilient bottom and resilient side walls is used. In certain implementations, both the transparent and/or translucent resilient bottom and resilient side walls are formed from the same or different silicone polymers. In another implementation, a basin comprising non-resilient acrylic side walls and a resilient silicone bottom is used. In another example, the bottom of the basin is defined by a rigid or semi-rigid, transparent and/or translucent solidification substrate that is connected to side walls formed of a resilient or plastically deformable polymeric material. In a further example, the substrate 52 may be coated with a resilient transparent material, such as a silicone, that extends only a portion of the way to the side walls, leaving a peripheral gap around the coating and between the coating and the sidewalls. In yet another example, the substrate 52 may be coated with a resilient transparent material that extends all the way to the side walls. In certain examples, a tilting mechanism may be provided that tilts the solidifiable paste container 48 with respect to the build platform 44 to peel solidified solidifiable paste from the bottom of the solidifiable paste container. A non-resilient material such as a transparent non-resilient film 55 may also be provided as a layer on top of the resilient bottom between the resilient bottom and the build platform 44.

Figure 6:
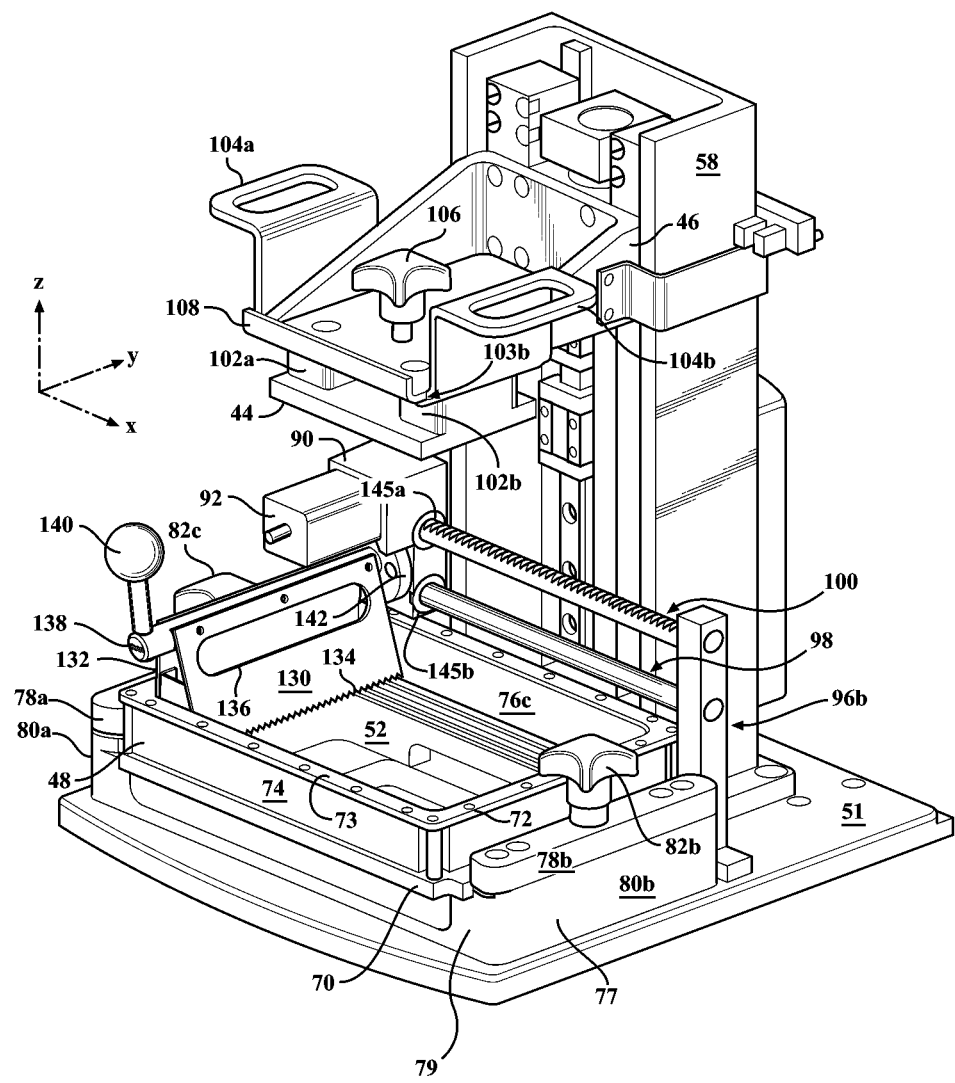
FIG. 6 is a perspective view of an apparatus for making a three-dimensional object from a solidifiable paste in an upside down build process, wherein the apparatus includes a third exemplary paste spreader assembly with the first and second spreaders in a first rotational orientation.

In FIGS. 2 and 3 the solidifiable paste container 48 is secured to the housing 54 (see FIG. 1) by a solidifiable paste container holder 77 (see FIG. 6). Only a portion of the solidifiable paste container holder 77 is visible in FIGS. 2 and 3. Solidifiable paste container holder 77 comprises a lower frame 79 and two locking members 78a and 78b which are spaced apart from one another along the x-axis. The lower frame 79 comprises two side walls 80a and 80b. To secure the solidifiable paste container 48 to housing 54, knobs 82a and 82b are rotated to loosen the locking members 78a and 78b, which may then be slid upward along sliding supports (not shown). The base 70 is then inserted along the y-axis direction so that the sides of base 70 which are spaced apart along the x-axis may be inserted into the two spaces defined on one side by the locking member 78a and lower frame sidewall 80a and on the other side by the locking member 78b and lower frame sidewall 80b. Once the solidifiable paste container 48 is thusly inserted, the locking members 78a and 78b may be placed in abutting engagement with respective sides of the base 70, and the knobs 82a and 82b may be rotated to lock the base 70 and the container 48 into place.

Referring again to FIGS. 2 and 3, a build platform assembly is provided comprising build platform 44, build platform handles 104a and 104b and build platform vertical supports 102a and 102b. A build platform holder comprising a metal plate 107 with side grooves 103a and 103b (FIG. 6 shows groove 103b) is fixedly attached to build platform holder support 46, which is in turn fixedly attached to build platform elevator 58. The build platform holder support 46 is movable along the build (z) axis to move the build platform 44 in first and second directions (up and down) along the build (z) axis. The build platform assembly is removably securable to the build platform holder support 46 via engagement with the side grooves 103a and 103b. An upper build platform engagement surface 108 is provided as part of build platform holder 104 and slides into the grooves 103a and 103b. Knob 106 releasably tightens the engagement surface 108 within the grooves 103a and 103b. A build platform motor (not shown) is selectively energizable to move build platform holder support 46 along elevator 58 to move the build platform 44 towards or way from the solidifiable paste container 48 along the build (z) axis. In certain examples, a build platform controller is provided which outputs a signal to the build platform motor to selectively energize and de-energize the build platform motor as directed by one or more control programs stored in the controller memory and executed by the controller processor.

The system of FIGS. 2 and 3 also includes a paste spreader assembly 84. The paste spreader assembly 84 comprises a spreader 86, that is mounted to a carriage 90. Following the solidification of one or more layers of object 59 (FIG. 1), the spreader 86 is traversed along the x-axis to spread the solidifiable paste and fill in areas of solidifiable paste that were depleted due to solidification. A variety of different spreader 86 geometries may be provided. In certain implementations, the spreader 86 comprises a single blade with a length along the y-axis direction and a height along the build (z) axis direction. In other implementations, and as illustrated in greater detail in FIGS. 6-10, the spreader 86 may comprise two blades, each having a length along the y-axis and a width perpendicular to the length. In addition, while the spreader is traversed along the x-axis in the example of FIGS. 2-3, it may be configured instead to be traversed along the y-axis. In certain preferred examples, the direction of traversal corresponds to the smaller dimension of the solidifiable paste container 48 in the x-y plane.

In certain examples, a paste spreading operation may be carried out by traversing the spreader 86 following the solidification of each layer. However, in other examples, it may not be necessary to traverse the spreader if the x-y region of solidifiable paste that is used to form one layer is distinct and non-overlapping with the x-y region of solidifiable paste used to form an immediately adjacent layer because the formation of one layer will not deplete paste from the x-y region used to form the adjacent layer. Thus, in some preferred examples, a paste spreading operation is carried out only when the x-y area of the next object layer to be formed intersects or overlaps with the x-y area of the previously formed layer.

In the example of FIGS. 2 and 3, the spreader 86 has a length along the y-axis and a height perpendicular to the length. The height dimension may be pivoted to different rotational orientations in the x-z plane, as described further below. In FIGS. 2 and 3 the height dimension of spreader 86 is parallel to the build (z) axis. The spreader 86 comprises a shaft or elongated member 88 that extends along the y-axis and a plurality of blades 89a-89g, each of which has lengths along the y-axis and heights perpendicular to their lengths such that their heights are longer, preferably twice as long, and more preferably about three times as long as their respective lengths along the y-axis. As shown in FIGS. 2 and 3 in certain exemplary implementations, the blades 89a-89g have varying thicknesses in a direction perpendicular to their lengths and heights. In FIGS. 2-3 the blade thicknesses are oriented along the x-axis. In addition, the thicknesses of blades 89a-89g taper when moving away from shaft or elongated member 88. In FIGS. 2 and 3, the thickness dimension of the blades is oriented parallel to the x-axis and tapers when moving in a negative (downward) direction along the build (z) axis.

Because solidifiable pastes of the type described herein will not generally flow due to the force of gravity alone, the traversal of a spreader can cause volumes of solidifiable paste to become trapped between the spreader 86 and one of the inner frame walls 76a or 76b of the solidifiable paste container 48, thereby depleting the volume of paste available for forming subsequent object layers. The spreader 86 of FIGS. 2 and 3 is configured to reduce the amount of such trapped pastes. Blades 89a-89g are spaced apart from another along the y-axis direction so that each pair of adjacent blades is separated by a gap along the y-axis. As a result of this configuration, paste located in the gaps will not be spread across the container 48. This configuration may be used to impart a textured profile on the exposed surface of the solidifiable paste, with the region of the paste contacted by the blades being formed into a series of troughs or valleys that are separated by peaks. In addition, the blades 89a-89g are spaced apart from the container walls 76c and 76d. As shown in FIG. 3, blade 89a is spaced apart by a distance $\Delta y_1$ from wall 76d and blade 89g is spaced apart by a distance $\Delta y_2$ from wall 76c. The distances $\Delta y_1$ and $\Delta y_2$ may be the same or different. In addition, the inter-blade gap distances may be the same or different. The inter-blade y-axis gaps in FIG. 3 are shown as extending along the entire heights (which are along the z-axis in FIGS. 2 and 3) of blades 89a-89g. However, the gaps could be configured differently. In certain examples, the y-axis gaps are present only along a portion of the heights of the blades 89a-89g and are spaced apart from the spreader shaft or elongated member 88 along an axis defined by the blade heights (i.e., along the z-axis when the blades 89a-89g are in the rotational orientation of FIG. 2).

Spreader motor 92 is provided and may be selectively energized and de-energized to selectively move the spreader 86 along the x-axis. To facilitate x-axis movement, a carriage 90 is provided and is connected to spreader shaft or elongated member 88. Spreader motor 92 is preferably operatively connected to a pinion gear (not shown) that engages a rack gear 100 which extends along the x-axis. Rack gear 100 is supported by supports 96a and 96b which are spaced apart from one another along the x-axis and attached to the top surface 51 of housing 54 (FIG. 1). In FIGS. 2 and 3, only a portion of the rack gear supports 96a and 96b are shown and their connection to housing 54 is not visible.

A carriage guide 98 is also provided and extends along the x-axis. Carriage guide 98 is spaced apart from the rack gear 100 along the build (z) axis. Carriage 90 includes two openings that face along the x-axis with bushings (not shown in FIGS. 2-3) mounted therein, and the rack gear 100 and carriage guide 98 each engage a respective one of the bushings. When spreader motor 92 is energized, the pinion gear (not shown) rotates about an axis of rotation parallel to the y-axis. The engagement of the pinion gear teeth with complementary rack gear 100 teeth, causes the carriage 90 to move along the rack gear 100 and along the x-axis. When the pinion gear rotates in a first direction about its axis of rotation, the carriage 90 moves in the positive x-axis direction, and when the pinion gear rotates in a second direction about its axis of rotation, the carriage 90 moves in the negative x-axis direction.

In certain examples, spreader 86 is pivotable about a pivot axis that is parallel to the y-axis. In the example of FIGS. 2 and 3, shaft or elongated member 88 is rotatable about its longitudinal axis to pivot paste spreader 86 to a variety of different pivoted positions. The pivoting action changes the angular orientation between the height dimension of the blades 89a-89g and the bottom of the solidifiable paste container 48 (which is defined by the rigid or semi-rigid, transparent and/or translucent solidification substrate 52). The pivoting feature is particularly useful when the system may be used with different solidifiable pastes with different rheological properties. As shown in FIG. 2, the leading edges 91a-91g of the blades 89a-89g extend into the interior volume of the solidifiable paste container 48. The leading blade edges 91a-91g are spaced apart from solidification substrate 52 by a distance Δs. Pivoting the blades 89a-89g about the pivot axis defined by the shaft or elongated member 88 allows for the adjustment of the distance Δs. In addition, paste spreader assembly 84 may be pivotable and configured so that the shaft or elongated member 88 is adjustable along the build (z) axis to vary Δs. In general, it is preferable to reduce Δs for relatively higher viscosity solidifiable pastes as compared to relatively lower viscosity solidifiable pastes because higher viscosity pastes will tend to striate when traversing the spreader 86 along the x-axis, with the portion of the solidifiable paste lying beneath (z-axis) the leading blade edges 91a-91g tending to remain stationary as the blades 89a-89g spread the paste that lies above (z-axis) the leading edges 91a-91g.

Certain solidifiable pastes may have a tendency to form localized aggregations or clumps of material and/or to form bubbles. Such phenomena are undesirable because they ultimately reduce the ability to provide a homogeneous layer of solidifiable paste between the exposed object surface 64 (FIG. 1) and the solidification substrate 52. Thus, in certain examples, including that of FIGS. 2 and 3, the paste spreader assembly 84 includes a vibrator 94. The vibrator 94 comprises a motor and coupling connected to shaft or elongated member 88 which move the shaft or elongated member 88 along the build (z) axis relative to carriage 90, supports 96a and 96b, rack gear 100, carriage guide 98, and the solidifiable paste container 48. The vibration of spreader 86 causes blades 89a-89g to vibrate along the build (z) axis and creates localized forces to break up bubbles or agglomerated sections of paste. In general, the amplitude and/or frequency of vibration are selected to eliminate any air bubbles formed during a paste spreading operation. In certain examples, the amplitude and/or frequency of vibration are selected to create a textured exposed surface of solidifiable material (e.g., peaks and valleys or "static waves") so that the pressure exerted by the previously formed object surface 64 on the exposed surface of solidifiable paste creates a substantially flat level of solidifiable paste at the interface between the exposed object surface 64 and the exposed solidifiable paste surface. In certain preferred examples, the amplitude of vibration is at least about 1.5 times, more preferably at least about 1.7 times, and still more preferably at least about 2.0 times the desired layer thickness Δz of the solidified object layers. At the same time, the amplitude of vibration is preferably no more than about 6.0 times, more preferably no more than about 5.5 times, and still more preferably no more than about 5.0 times the desired layer thickness Δz. In general, the vibrational frequency is dependent on and increases with the speed of traversal of the spreader 86 in a direction perpendicular to the length of the spreader 86 (i.e., along the x-axis in FIGS. 2-3).

An exemplary method of making a three-dimensional object from a solidifiable paste will now be described. In accordance with the method, a solidifiable paste container such as container 48 is provided which includes an open top, a closed bottom, and which contains a solidifiable paste. In the system of FIGS. 2 and 3, the closed bottom of the solidifiable paste container 48 is defined by solidification substrate 52, or in the case of certain containers with films, the closed bottom is defined by solidification substrate 52 and a film that overlays or is coated on the solidification substrate 52 (see film 55 overlaying substrate 52 in FIG. 1). The solidifiable paste container 48 contains a solidifiable paste with an upward (z-axis) facing exposed surface. An exposed object surface such surface 64 of FIG. 1 is spaced apart from the solidification substrate 52 by a desired layer thickness Δz. Solidification energy is supplied in a solidification energy pattern defined by object data representative of the three-dimensional object to solidify a thickness of the solidifiable paste lying between exposed object surface 64 and solidification substrate 52, thereby forming a new section of the three-dimensional object 59. The exposed surface 64 of the newly formed object section is then moved along the build (z) axis away from the solidification substrate 52. Any regions in the solidifiable paste which have been depleted due to the solidification process are replenished with a portion of the volume of the solidifiable paste in the solidifiable paste container 48 (preferably without adding any fresh solidifiable paste) so a homogeneous section of solidifiable paste with a sufficient cross-sectional area in the x-y plane and the desired layer thickness Δz is available for solidifying the next object layer. The process is repeated until the object is complete. Fresh paste may be added periodically. However, in preferred examples, the replenishment of depleted paste occurs at least several times during the building of an object without adding fresh solidifiable paste to the solidifiable paste container. As discussed previously, in certain preferred implementations of the method, the regions of depleted paste are only replenished if the x-y area of the object layer that has just been formed intersects or overlaps with the x-y area of the next layer to be formed. In certain examples, a program stored in a controller that outputs a signal to energize or de-energize the spreader motor 90 will compare the x-y area of the object data for the next layer to be formed and the one that was just formed and determine whether the x-y areas intersect or overlap. If there is no intersection or overlap, the controller will not energize the spreader motor 90 and may instead set a variable value (e.g., the value of a flag). That variable value may then be supplied to a controller that operates the build platform motor (not shown) and used by a program stored in the build platform controller to determine when to move the build platform 44 so that the next layer can be formed. If paste spreading is not occurring, the build platform 44 need only be moved upward along the build (z) axis by Δz (the desired layer thickness). Instead of using separate controllers to operate the spreader motor 90 and the build platform motor (not shown), a single controller with suitable outputs to each motor may be provided.

Figure 11:
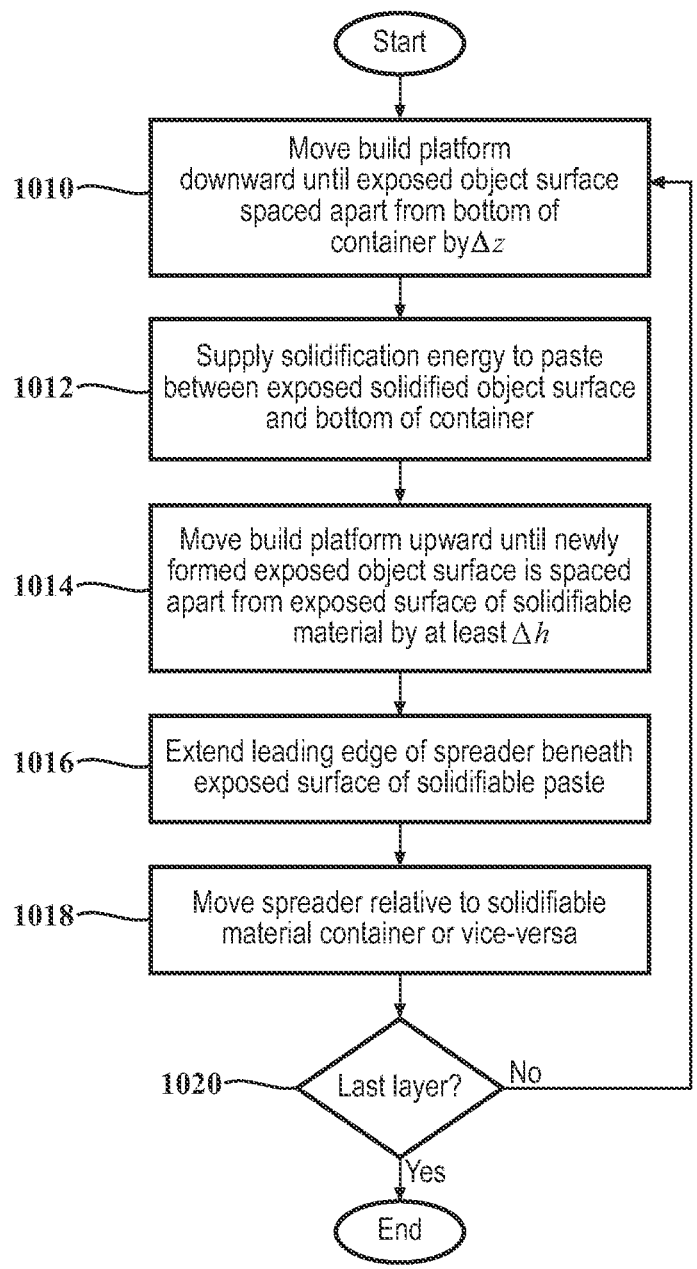
FIG. 11 is a flow chart illustrating a first exemplary method of making a three-dimensional object from a solidifiable paste.

Another exemplary method of making a three-dimensional object from a solidifiable paste is described by the flow chart of FIG. 11. In accordance with the method, a build platform is provided and is moved downward along the build (z) axis until the exposed object surface 64 (FIG. 1) is spaced apart from the bottom of the container by a desired layer thickness, $\Delta z$ (step 1010). Solidification energy is supplied by a pattern generator, an example of which is the linear solidification device 42 shown in FIG. 1. The solidification energy is projected through the closed bottom of the solidifiable paste container, which in the example of FIGS. 2 and 3 is the rigid or semi-rigid, transparent and/or translucent solidification substrate 52, and into the thickness of solidifiable paste located between the exposed object surface 64 and the substrate 52. The pattern of the supplied solidification energy corresponds to object data representative of the three-dimensional object and causes a corresponding portion of the solidifiable paste located between the exposed object surface 64 and the substrate 52 to solidify (step 1012).

In step 1014 the build platform motor (not shown) is energized to move the build platform holder support 46 in the positive build (z) axis direction (i.e., upward) away from the solidification substrate 52 (step 1014) by a distance that is sufficient to provide a build (z) axis clearance of at least $\Delta h$ between the exposed surface 64 (FIG. 1) of the three-dimensional object 59 and the paste spreader assembly 84 so that the spreader 86 can move along the x-axis without colliding with the three-dimensional object 59. In a preferred example, a controller is provided which outputs a signal to move the build platform 44 in the positive build (z) axis distance sufficient to provide a clearance of at least $\Delta h$ before outputting a signal to energize the paste spreader motor 92. In certain examples, one or more limit switches may be provided along the build platform elevator 58 to determine when the build platform 44 has reached a build (z) axis height at which there is a clearance of at least $\Delta h$. A controller operatively connected to the spreader motor 92 may receive a signal from the one or more limit switches and execute a program stored in the controller memory. The program may include instructions for selectively activating the spreader motor 92 when the limit switch signal indicates that the build platform has been elevated to define a clearance of at least $\Delta h$. In addition, the program may receive data indicative of the number of object layers and the thickness of the object layers to adjust the value of $\Delta h$ stored in the controller memory as the object grows in the negative build (z) axis direction so that the build platform 44 is elevated to a distance that accounts for the length of the object 59 along the build (z) axis.

In step 1016 the spreader 86 is positioned with its leading edge (i.e., the edge spaced apart from shaft or elongated member 88) beneath the exposed, upward (z-axis) facing surface of the solidifiable paste in the solidifiable paste container 48. In the case of FIGS. 2 and 3, step 1016 involves positioning spreader 86 so that the blade leading edges 91*a*-91*g* are beneath the exposed surface of solidifiable paste. In step 1018 the spreader 86 is moved relative to the solidifiable paste container 48 and/or the solidifiable paste container 48 is moved relative to the spreader 86. In the example of FIGS. 2 and 3, step 1018 is carried out by energizing the spreader motor 92 to rotate the pinion gear (not shown) engaged with rack gear 100 and traverse the carriage 90 along the lengths of rack gear 100 and carriage guide 98 along the x-axis. However, other configurations may be used to perform step 1016. For example, the solidifiable paste container 48 may be configured to move along the x-axis relative to the spreader 86 while the spreader 86 remains stationary. In certain examples, step 1016 may further comprise pivoting the spreader blades 89*a*-89*g* about the pivot axis defined by shaft or elongated member 88.

In step 1020, a determination is made as to whether the last layer of three-dimensional object 59 has been formed. If it has, the method ends. Otherwise, control returns to step 1010 to form the next layer of the three-dimensional object 59. As discussed previously, in certain preferred implementations of the method of FIG. 11, steps 1014-1018 are only carried out if the x-y area of the object layer that has just been formed intersects or overlaps with the x-y area of the next layer to be formed. In certain examples, a program stored in a controller that outputs a signal to energize or de-energize the spreader motor 90 will compare the x-y area of the object data for the next layer to be formed and the one that was just formed and determine whether the x-y areas intersect or overlap. If there is no intersection or overlap, the controller will not energize the spreader motor 90 and may instead set a variable value (e.g., the value of a flag). That variable value may then be supplied to a controller that operates the build platform motor (not shown) and used by a program stored in the build platform controller to determine when to move the build platform 44 so that the next layer can be formed. In the case where a current layer does not intersect or overlap the previous layer in the x-y plane, the method of FIG. 11 would proceed from step 1012 to step 1020, bypassing steps 1014-1018. Instead of using separate controllers to operate the spreader motor 90 and the build platform motor (not shown), a single controller with suitable outputs to each motor may be provided.

With certain spreader designs, carrying out step 1018 may cause an undesirably large volume of solidifiable paste to become trapped between the spreader 86 and inner container wall 76*a* or 76*b* (depending on the direction of the spreader's traversal along the x-axis). Due to its viscosity, the trapped solidifiable paste may limit the x-axis movement of the spreader 86 to an end-of-travel x-axis location where the spreader 86 is spaced apart from the container wall 76*a* or 76*b* towards which it is moving. If such trapping occurs each time the spreader 86 is traversed, it can cause an accumulation of paste proximate the walls 76*a* and 76*b*. The accumulated solidifiable paste becomes effectively unusable for forming layers of the three-dimensional object 59. Thus, in certain modified versions of the method of FIG. 11, the spreader 86 will be lifted out of the solidifiable paste (along the build (z) axis) and moved along the x-axis to a location proximate one of the walls 76*a* and 76*b*. The leading edge of the spreader 86 will then be reinserted into the solidifiable paste at the new x-axis location and traversed away from the proximate wall 76*a* or 76*b*, thereby making the previously trapped paste available for forming the three-dimensional object.

FIGS. 2 and 3 depict a paste spreader assembly 84 that is configured to allow the spreader 86 to be moved out of the solidifiable paste along the build (z) axis and reinserted proximate one of the inner solidifiable paste container walls 76*a* and 76*b*. In FIG. 2 two pivoted orientations of the spreader blades 89*a*-89*g* are shown in phantom. In one pivoted orientation, the height dimension of the blades 89*a*-89*g* extends in one direction along the x-axis, and in the other pivoted orientation, the height dimension of the blades 89*a*-89*g* extends in another direction along the x-axis. With the blades 89*a*-89*g* thusly pivoted, the carriage 90 can be translated along the x-axis to locations between walls 76*a* and 76*b* and any trapped paste near the walls. The blades 89*a*-89*g* may then be pivoted downward so their leading edges 91*a*-91*g* extend into the trapped paste. Operation of the spreader motor 92 then traverses the carriage 90 and the spreader blades 89a-89g to spread the trapped paste in a direction away from which ever wall 76a or 76b against which the paste was initially trapped. In certain examples, a motor may be provided and operatively connected to the paste spreader 86 to pivot the paste spreader 86 and/or elevate its build (z) axis position to automatically lift the paste spreader 86 out of the solidifiable paste, after which motor 92 traverses the paste spreader 86 along the x-axis proximate the closest inner container wall 76a and 76b. The controller may then activate the pivoting motor to pivot the paste spreader and lower it back into the solidifiable paste so that a spreading operation may begin.

Figure 4:
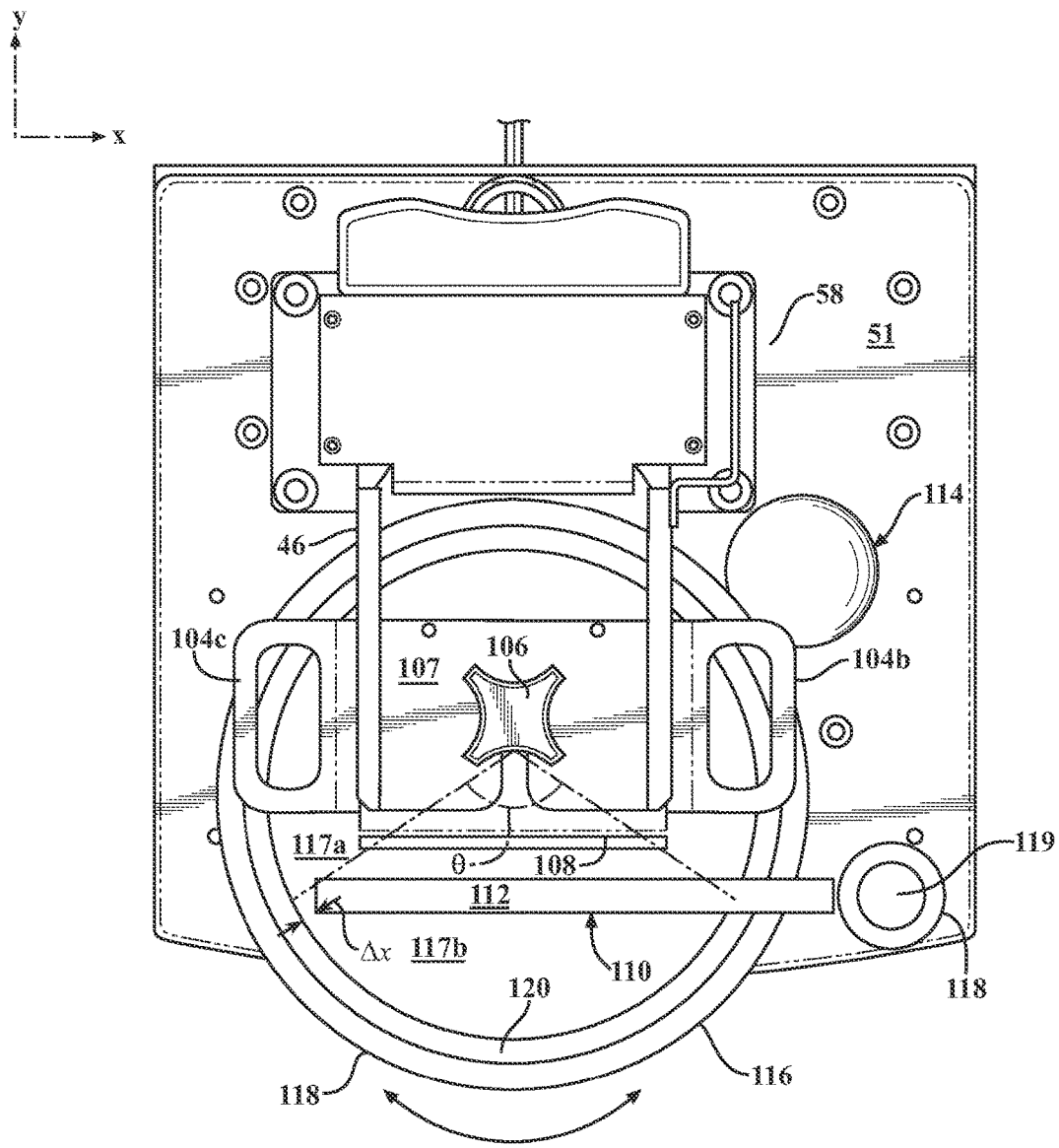
FIG. 4 is a top plan view of an apparatus for making a three-dimensional object from a solidifiable paste in an upside down build process, wherein the apparatus includes a second exemplary paste spreader assembly.
Figure 5:
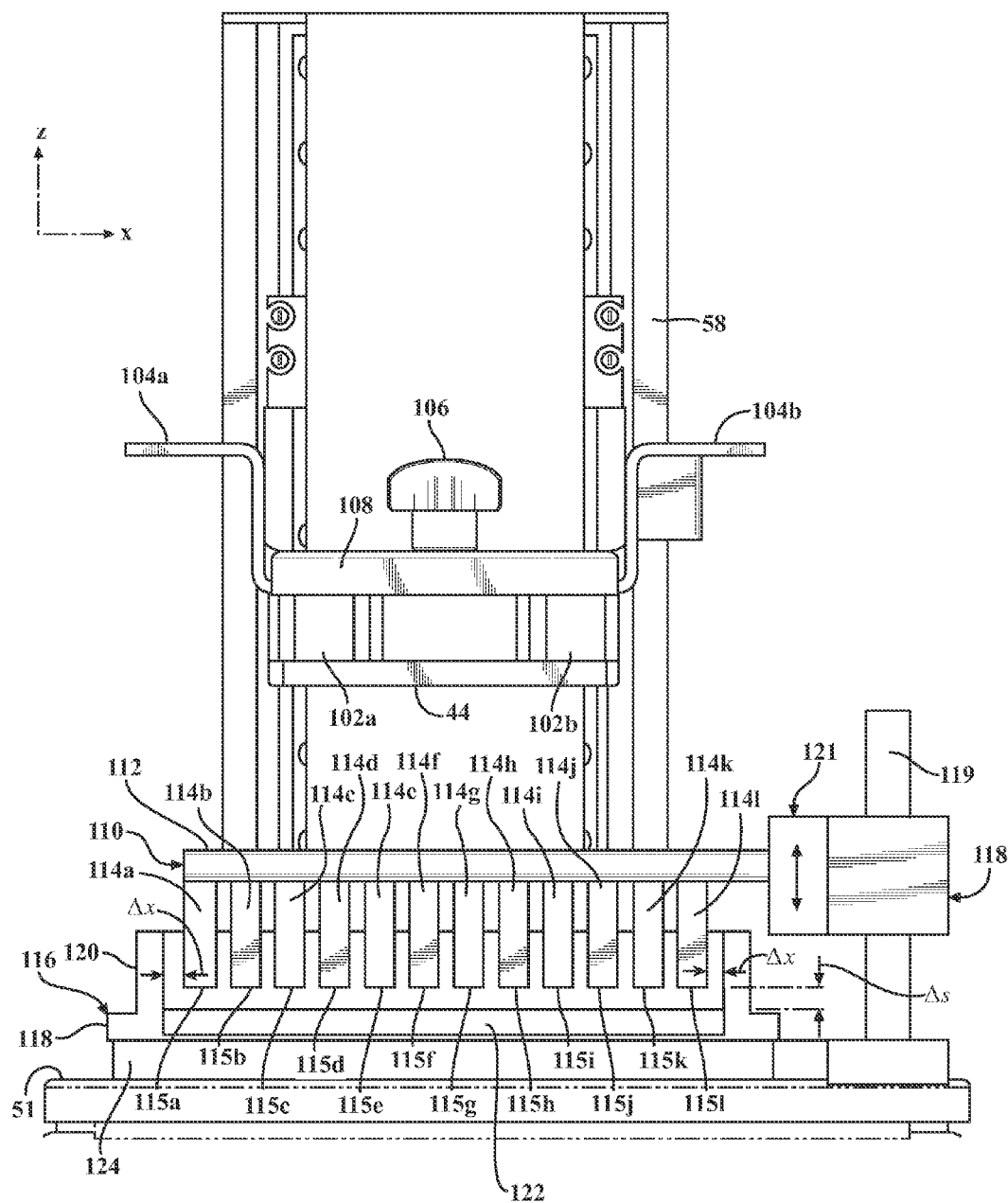
FIG. 5 is a front elevational view of the apparatus of FIG. 4.

Referring to FIGS. 4 and 5, a second exemplary apparatus for making a three-dimensional object from a solidifiable paste is depicted. As with the system of FIGS. 2 and 3, housing 54 and linear solidification device 42 (or another pattern generator) would be used but are not shown. The build platform assembly and elevator 58 are configured and operate in the manner described previously with respect to FIGS. 2 and 3.

In the system of FIGS. 4 and 5, the solidifiable paste container 116 has a circular profile when viewed along the build (z) axis, as best seen in FIG. 4. The solidifiable paste container 116 comprises a vertical wall 120 with a height along the build (z) axis and a radially outward extending flange 118. A radially extending inward flange (not shown in FIGS. 3 and 4) is also provided, and a rigid or semi-rigid, transparent and/or translucent solidification substrate 122 is positioned in abutting engagement with the radially-extending inward flange and may be attached thereto by suitable means of attachment, including adhesives or mechanical fasteners. The solidifiable paste container 116 is mounted to a rotating platform 124 that is rotatably attached to the top surface 51 of the housing 54 (FIG. 1) to rotate the solidifiable paste container. The rotating platform 124 is rotatable about an axis of rotation parallel to the build (z) axis. Other than the circular geometry, solidifiable paste container 116 may be configured similarly to the other solidifiable paste containers described previously.

Paste spreader 110 comprises a shaft or elongated member 112 that has a length along the x-axis. However, in other examples, shaft or elongated member 112 may extend along the y-axis. In certain examples, the shaft or elongated member 112 may be positioned to intersect the center axis of the solidifiable paste container 116 about which the container 116 rotates. In other examples, and as shown in FIG. 4, the paste spreader 110 is offset from the center axis of the solidifiable paste container 116. Paste spreader 110 is oriented to divide the area of the solidifiable paste container 116 that is perpendicular to the build (z) axis into first x-y area 117a and second x-y area 117b. The build platform 44 is movable along the build (z) axis and positioned in first x-y area 117a during an object building operation. In accordance with certain examples of apparatuses for making three-dimensional objects from solidifiable paste, and as illustrated by the exemplary apparatus of FIGS. 4 and 5, a paste spreading operation may be carried out by rotating the paste spreader 110 relative to the solidifiable paste container 116 or vice-versa. In the example of FIGS. 4 and 5, during a paste spreading operation the paste spreader 110 remains stationary and the solidifiable paste container 116 rotates about the center axis of the container 116. Paste spreader 110 comprises a plurality of blades 114a-114l having widths along the x-axis and heights extending perpendicularly to the length of shaft or elongated member 112 and the x-axis. In the example of FIGS. 4 and 5, the blades 114a-114l are oriented so that each blade 114a-114l is spaced apart from its neighbor or neighbors by an x-axis gap. In addition, the outermost blades 114a and 114l are spaced apart from the inner surface of the solidifiable paste container vertical wall 120 by a gap $\Delta x$. As with the example of FIGS. 2 and 3, the inter-blade gaps and the gaps between the blades and the container walls reduce the amount of solidifiable paste that is trapped against the container wall during a paste spreading operation. The inter-blade x-axis gaps in FIG. 5 are shown as extending along the entire heights (which are along the z-axis in FIG. 5) of blades 114a-114l. However, the gaps could be configured differently. In certain examples, the x-axis gaps are present only along a portion of the heights of the blades 114a-114l and are spaced apart from the spreader shaft or elongated member 110 along an axis defined by the blade heights (i.e., along the z-axis when the blades 114a-114l are in the orientation of FIG. 5).

Spreader shaft or elongated member 112 is connected to a carriage 118 that is attached to a vertical support 119 mounted on the top surface 51 of housing 54 (FIG. 1). The carriage 118 can be selectively moved and secured to different positions along the build (z) axis to change the distance $\Delta s$ between the leading edges 115a-115l of the blades 114a-114l and the solidification substrate 122. As with the example of FIGS. 2 and 3, it is generally preferable to use lower values of $\Delta s$ for solidifiable pastes with relatively higher viscosities and higher values of $\Delta s$ for pastes with relatively lower viscosities.

Solidifiable paste container motor 114 (FIG. 4) is provided to rotate solidifiable paste container 116 in the x-y plane relative to paste spreader 110. Rotating platform 124 is provided with a plurality of vertical gear teeth arranged around its circumference, each gear tooth having a length along the build (z) axis direction. Energizing motor 114 causes complementary teeth of a motor gear (not shown) to engage the gear teeth of rotating platform 124 so that rotation of the motor gear causes the rotating platform 124 to rotate in the x-y plane about the center axis of the solidifiable paste container 116. In certain examples, a controller is provided which selectively outputs a signal to solidifiable paste container motor 114 to cause it to rotate when a paste spreading operation is desired. In certain examples, the output of the signal to the motor 114 is determined by one or more programs stored in the controller memory and executed by the controller processor. As with the example of FIGS. 2-3, limit switches may be provided and connected to provide limit switch signals to the controller. A controller program may then use the limit switch signals to determine when to begin a paste spreading operation by outputting a signal to the motor 114. Signals from the limit switches may also be used by a controller that outputs a signal to a build platform motor (not shown) in accordance with a program stored in the controller memory to move the build platform 44 to the desired build (z) axis location once a paste spreading operation is complete. One or more limit switches may also be provided on the build platform elevator 58, and signals from the limit switches may be provided to spreader motor 114 to selectively energize the spreader motor 114 and begin a paste spreading operation once the build platform 44 is at a build (z) axis position that provides a sufficient clearance between the exposed object surface 64 and the solidifiable paste as the paste is being spread. In certain examples, a paste spreading operation may be carried out by rotating the solidifiable paste container 116 relative to the spreader 110 or vice-versa following the solidification of each layer. However, in other examples, it may not be necessary to perform a paste spreading operation if the x-y region of solidifiable paste that is used to form one layer is distinct and non-overlapping with the x-y region of solidifiable paste used to form an adjacent layer because the formation of one layer will not deplete paste from the x-y region used to form the adjacent layer. Thus, in some preferred examples, a paste spreading operation is carried out only when the x-y area of the next object layer to be formed intersects or overlaps with the x-y area of the previously formed layer.

Figure 13:
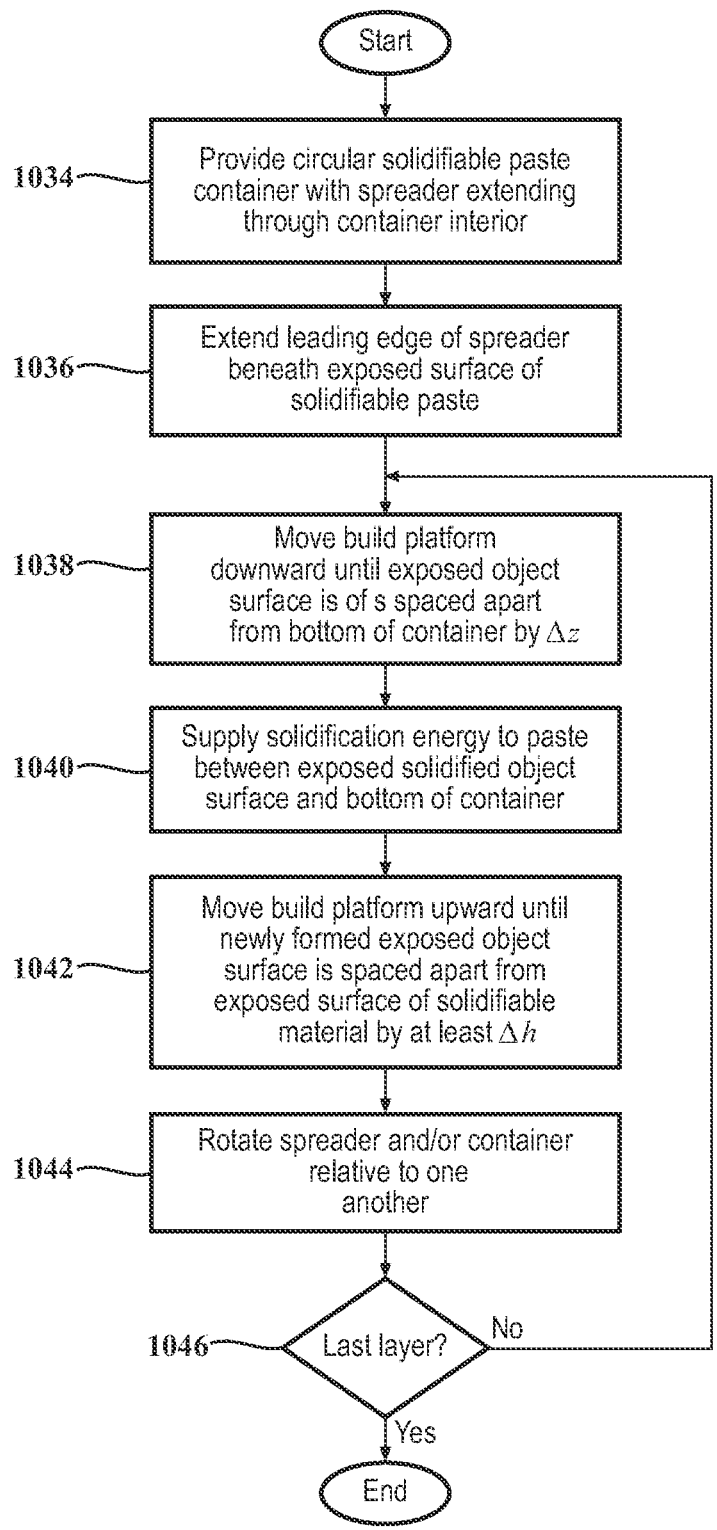
FIG. 13 is a flow chart depicting a second exemplary method of making a three-dimensional object from a solidifiable paste.

Referring to FIG. 13 a method of using the apparatus of FIGS. 4 and 5 to make a three-dimensional object from a solidifiable paste is described. In accordance with the method, a circular solidifiable paste container 116 is provided with a paste spreader 110 that is aligned with the container 116 so as to extend through a portion of the area in which the interior volume of the container 116 lies (step 1034). In the example of FIGS. 4 and 5, the paste spreader 110 is offset from the central axis of the solidifiable paste container 116 (i.e., the axis that extends through the center of the circular cross-section of the solidifiable paste container when viewed in a direction along the build (z) axis). In step 1036, the leading edge of the paste spreader 110 (which comprises leading edges 115*a* to 115*l* in the case of paste spreader 110) is extended beneath the exposed, upward facing surface of solidifiable paste (not shown) contained in solidifiable paste container 116 to define a distance of Δs between the leading edges 115*a* to 115*l* and the rigid or semi-rigid, transparent and/or translucent solidification substrate 122.

The build platform motor (not shown) is energized by a controller (not shown) to cause the build platform 44 to move downward along the build (z) axis until the exposed surface 64 (FIG. 1) of the last formed object layer is spaced apart from the solidification substrate 122 by a desired layer thickness Δz (Step 1038). In step 1040 solidification energy is supplied by linear solidification device 42 (FIG. 1) or whatever pattern generator is used to solidify a portion of the solidifiable material in a pattern corresponding to the pattern of the supplied solidification energy.

The build platform 44 is raised along the build (z) axis by a distance sufficient to provide a clearance of at least Δh between the exposed object surface 64 and the surface of the solidifiable paste. In the apparatus of FIGS. 4 and 5, the paste spreader 110 remains stationary during paste spreading operations and does not traverse the x-y area occupied by the build platform 44. Thus, unlike the apparatus of FIGS. 2 and 3, collisions between the object 59 and the paste spreader 110 are not of concern. However, it may still be necessary to elevate the build platform by a distance Δh that is sufficient to ensure that during the spreading operation, unsolidified paste will not contact the object 59 (FIG. 1) to minimize the likelihood that the moving paste will damage object 59.

In step 1044, the paste spreader 110 and container 116 are rotated relative to one another, either by rotating either or both of the paste spreader 110 and the container 116. In the example of FIGS. 4 and 5, the solidifiable paste container 116 rotates, and the paste spreader 110 remains stationary. In certain examples, during step 1044 vibrator 121 (FIG. 5) is operated to quickly traverse paste spreader 110 up and down by a short distance along the build (z) axis as the solidifiable paste container 116 rotates. The use of vibrator 121 helps break up bubbles and agglomerations of solidifiable paste. In general, the amplitude and/or frequency of vibration are selected to eliminate any air bubbles formed during a paste spreading operation. In certain examples, the amplitude and/or frequency of vibration are selected to create a textured exposed surface of solidifiable material (e.g., peaks and valleys or "static waves") to that the pressure exerted by the previously formed object surface 64 on the exposed surface of solidifiable paste creates a substantially flat level of solidifiable paste at the interface between the exposed object surface 64 and the exposed solidifiable paste surface. In certain preferred examples, the amplitude of vibration is at least about 1.5 times, more preferably at least about 1.7 times, and still more preferably at least about 2.0 times the desired layer thickness Δz. At the same time, the amplitude of vibration is preferably no more than about 6.0 times, more preferably no more than about 5.5 times, and still more preferably no more than about 5.0 times the desired layer thickness Δz. In general, the vibrational frequency is dependent on and increases with the relative speed of rotation of the solidifiable paste container 116 and the paste spreader 110.

A determination is then made as to whether the last layer of the solidified object 59 (FIG. 1) has been reached (step 1046). If it has, the process ends. Otherwise, control transfers to step 1038, and steps 1038-1044 are repeated. As discussed previously, in certain preferred implementations of the method of FIG. 13, steps 1040-1044 are only carried out if the x-y area of the object layer that has just been formed intersects or overlaps with the x-y area of the next layer to be formed. In certain examples, a program stored in a controller that outputs a signal to energize or de-energize the spreader motor 114 will compare the x-y area of the object data for the next layer to be formed and the one that was just formed and determine whether the x-y areas intersect or overlap. If there is no intersection or overlap, the controller will not energize the spreader motor 114 and may instead set a variable value (e.g., the value of a flag). That variable value may then be supplied to a controller that operates the build platform motor (not shown) and used by a program stored in the build platform controller to determine when to move the build platform 44 so that the next layer can be formed. In the case where a current layer does not intersect or overlap the previous layer in the x-y plane, the method of FIG. 13 would proceed from step 1040 to step 1046, bypassing steps 1042-1044. Instead of using separate controllers to operate the spreader motor 90 and the build platform motor (not shown), a single controller with suitable outputs to each motor may be provided.

Referring again to FIG. 4, paste spreader 110 is spaced apart from the center of the solidifiable paste container 116 to define a first area 117*a* and a second area 117*b* in the x-y plane. The first area 117*a* is larger than the second area 117*b* and defines the area in the x-y plane in which build platform 44 is located. In general, as the spacing between the paste spreader 110 and the center of the solidifiable paste container 116 in the x-y plane increases, it is preferable to increase the degree of rotation of the solidifiable paste container 116 relative to the paste spreader 110 (or vice-versa) to ensure that the same internal cross-sectional area of solidifiable paste container 48 is traversed by the paste spreader 110 during a paste spreading operation. In one example, wherein the paste spreader 110 passes through the center of the solidifiable paste container 116 in the x-y plane, the solidifiable paste container 116 rotates by 180 degrees Or radians) relative to the paste spreader 110 (either by rotating the paste spreader 110, the container 116, or both). However, in the example of FIG. 4 wherein paste spreader 110 is offset from the center of solidifiable paste container 116 in the x-y plane, the solidifiable paste container 116 rotates by more than 180 degrees Or radians) during step 1044 of FIG. 13. In a preferred example, the angle of rotation of solidifiable paste container 116 and paste spreader 110 relative to one another is equal to about 2π−θ, where θ is the angle in radians defined by a chord that extends along the length of paste spreader 110 to the inner surface of the vertical wall 120 of solidifiable paste container 116. For example, if θ is π/2 radians (90 degrees), the angle of rotation of solidifiable paste container 116 and paste spreader 110 relative to one another will preferably be 1.5π (270 degrees).

As the foregoing paragraph indicates, in certain preferred examples, during a paste spreading operation, the solidifiable paste container 116 and the spreader 112 will undergo relative rotation of no less than 180 degrees Or radians). However, in certain examples, the extent of the rotation can be less than 180 degrees. In general, the extent of the relative rotation should be sufficient to ensure that the solidifiable paste lying in the x-y region occupied by the build platform 44 will be spread. In other examples, the extent of the relative rotation need only be sufficient to spread paste lying in the x-y region occupied by the next object layer to be solidified, which may be only a portion of the full x-y region occupied by the build platform. Again, where the x-y region occupied by the next object layer to be formed does not intersect or overlap the x-y region of the immediately preceding layer, it may be unnecessary to perform a paste spreading operation.

Referring to FIGS. 6-10, another example of an apparatus for making a three-dimensional object from a solidifiable paste is depicted. The example of FIGS. 6-10 is similar to the example of FIGS. 2 and 3 in that the same housing 54 (FIG. 1) and solidifiable paste container 48 are used, along with a linear solidification device 42 (FIG. 1) or other pattern generator of the type described previously). Also, the build platform assembly (i.e., build platform 44, build platform handles 104a and 104b, build platform holder 104 and build platform holder support 46) is the same as in FIGS. 2 and 3. However, the paste spreader assembly 128 is configured differently. Like the apparatus of FIGS. 2-3, the paste spreader assembly 128 is depicted as being traversable along the x-axis to carry out a paste spreading operation but may alternatively be configured to be traversed along the y-axis to carry out such operations.

In FIGS. 6-10 paste spreader assembly 128 comprises first and second paste spreaders which are exemplified as first and second blades 130 and 132, each of which has a length along the y-axis. The first blade 130 and second blade 132 are connected to a shaft 138 with a handle 140 that projects away from the blades 130 and 132. When viewed along the y-axis, the first blade 130 and second blade 132 each have heights perpendicular to their respective lengths which define an angle α relative to one another (FIGS. 8A and 8B). The angle α is preferably at least about π/36 radians (5 degrees), more preferably at least about π/18 radians (10 degrees), and still more preferably at least about π/12 radians (15 degrees). At the same time, the angle α is preferably no greater than about 7π/36 radians (35 degrees), more preferably no greater than about π/6 radians (30 degrees), and still more preferably no greater than about 5π/36 radians (25 degrees). In one preferred example, α is about π/9 radians (20 degrees).

Figure 7:
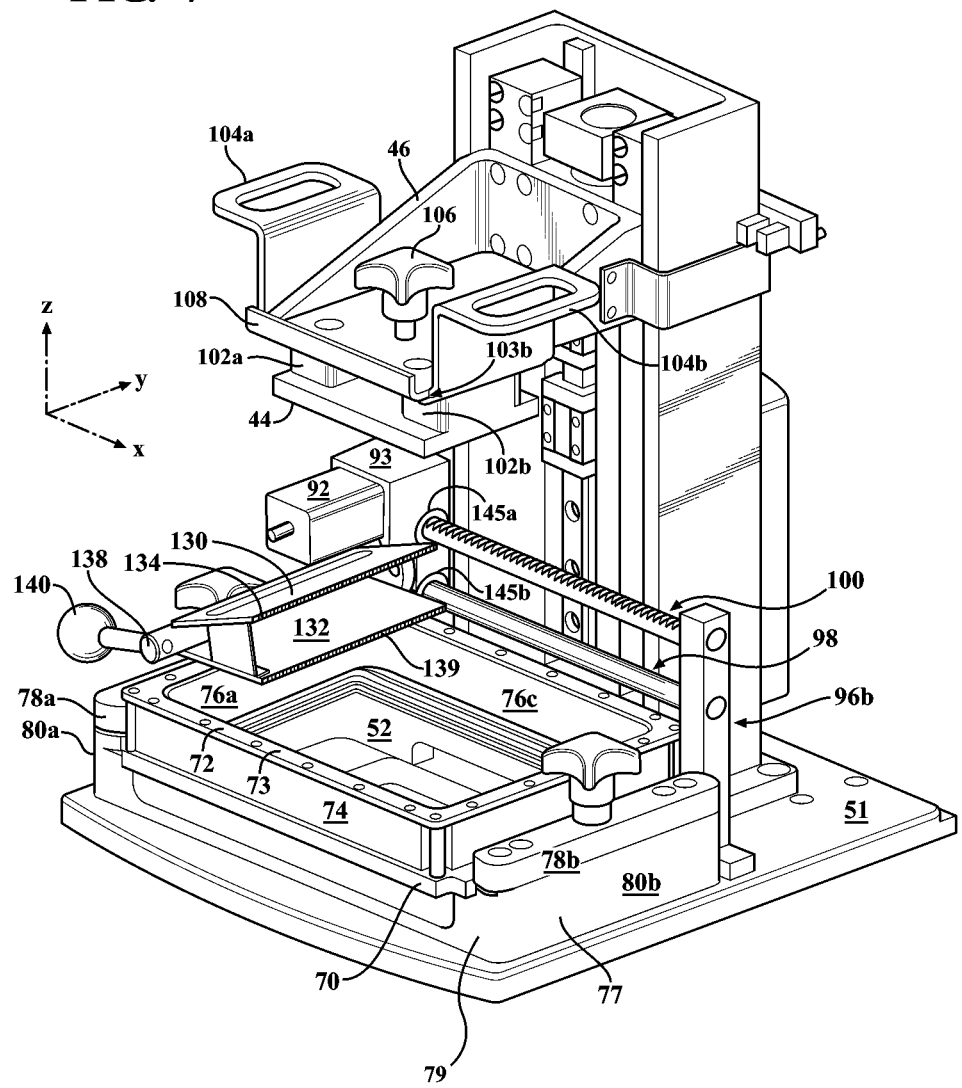
FIG. 7 is a perspective view of the apparatus of claim 7 with the first and second spreaders in a second rotational orientation.
Figure 8B:
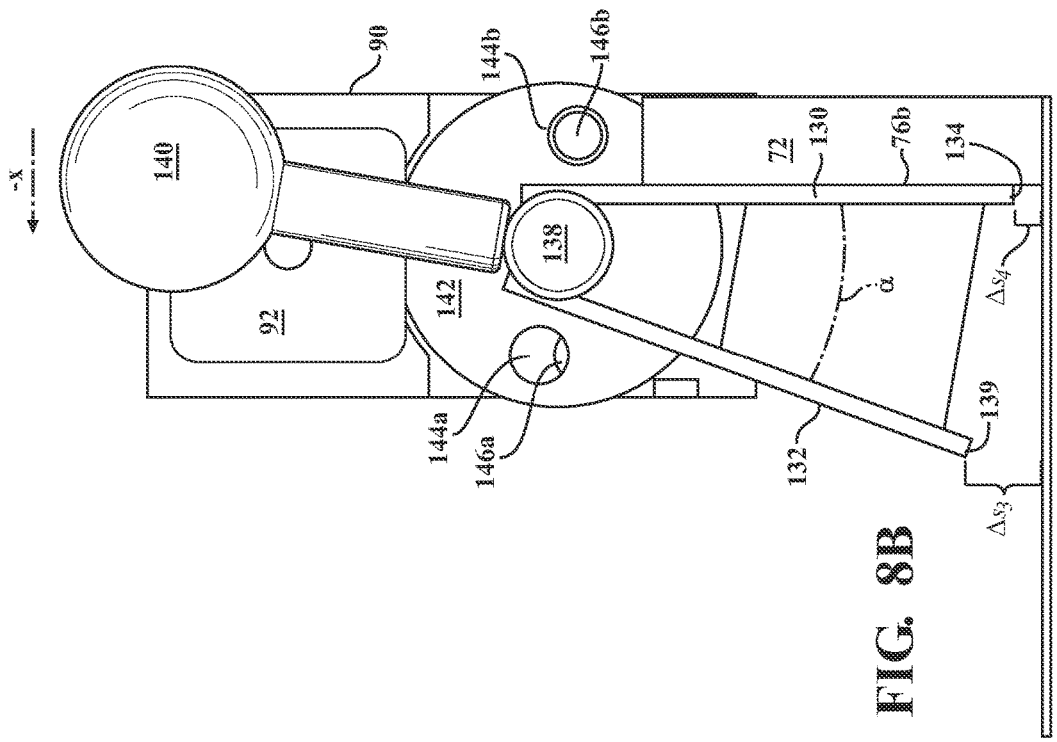
FIG. 8B is a close-up view of the portion of the paste spreader assembly of FIG. 8A with the first and second spreaders in a third rotational orientation and the first spreader in abutting engagement with the inner wall of the solidifiable paste container following a first paste spreading operation and before initiating a second paste spreading operation.
Figure 8A:
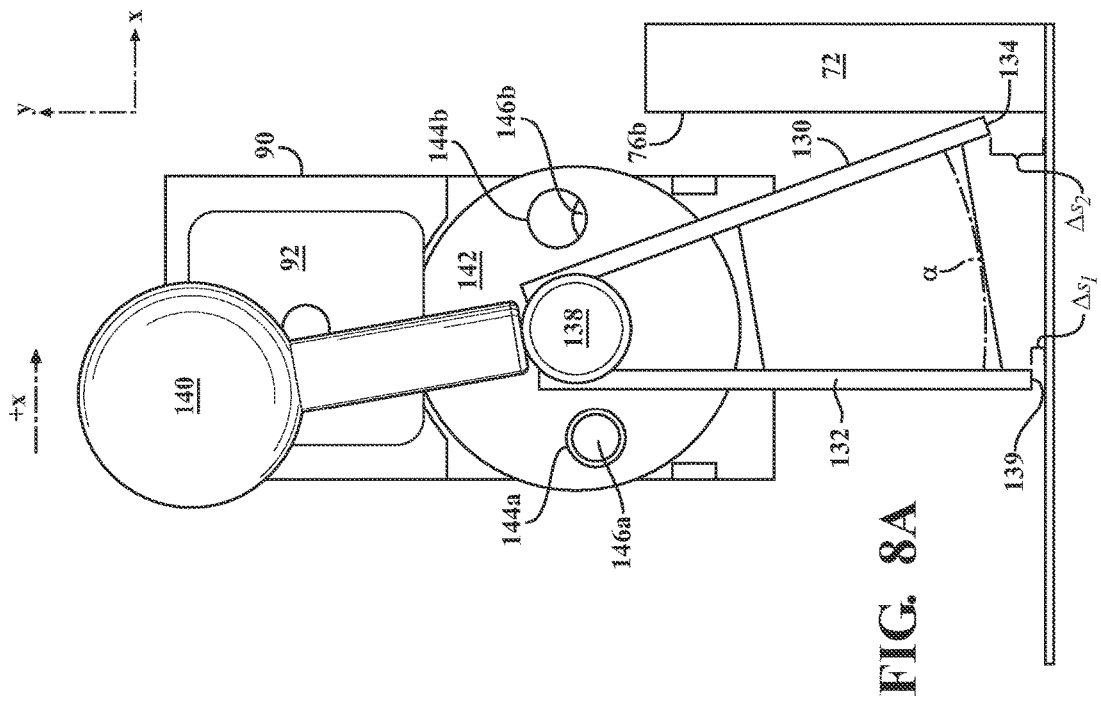
FIG. 8A is a close-up view of a portion of the paste spreader assembly of FIG. 6 with the first and second spreaders in the first rotational orientation of FIG. 6 showing the first spreader approaching abutting engagement with an inner wall of the solidifiable paste container assembly during a first paste spreading operation.
Figure 9:
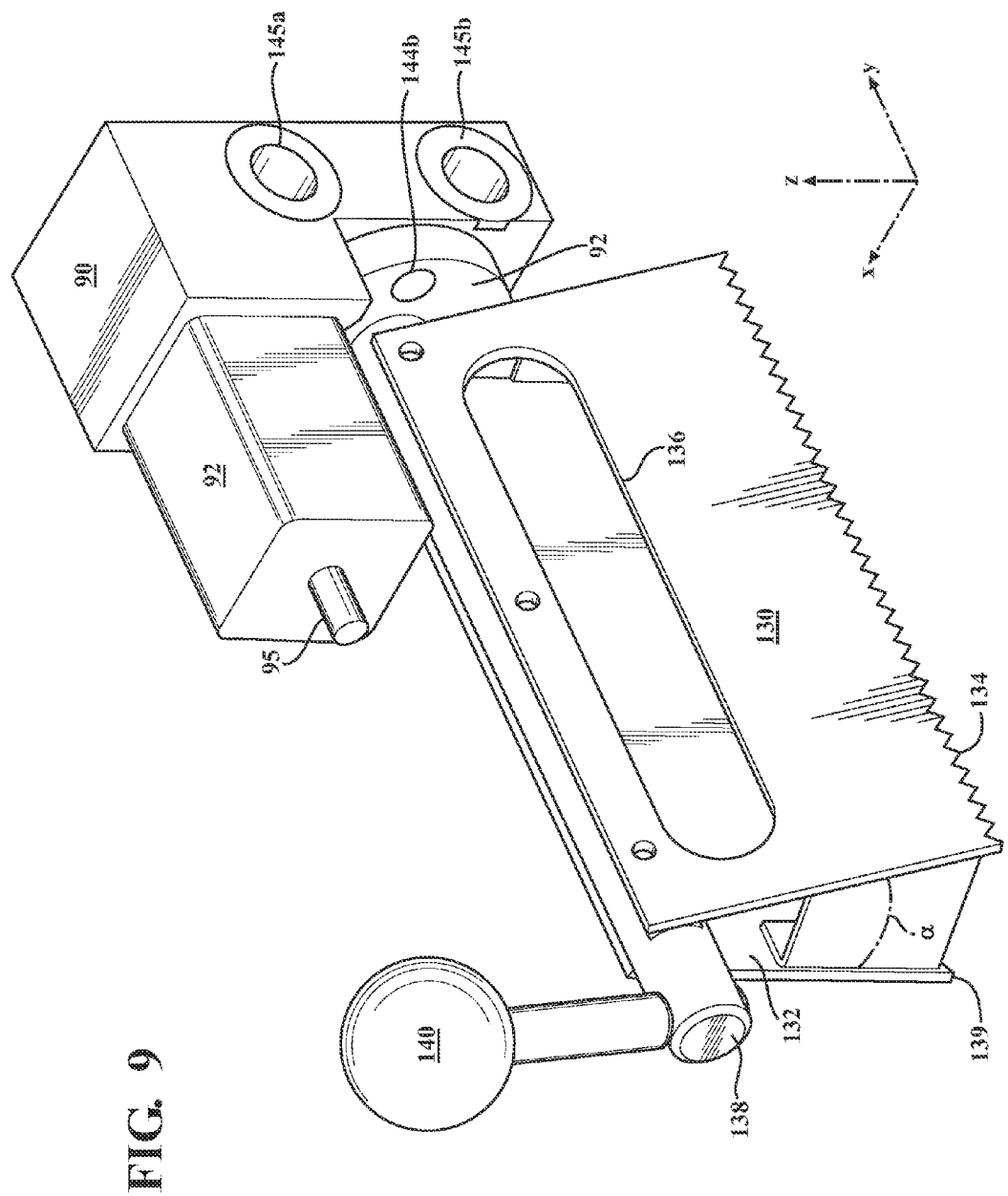
FIG. 9 is a close-up perspective view of a portion of the paste spreader assembly of FIG. 6 showing the spreader assembly motor, first and second spreader blades, carriage, and rotational lock.
Figure 10:
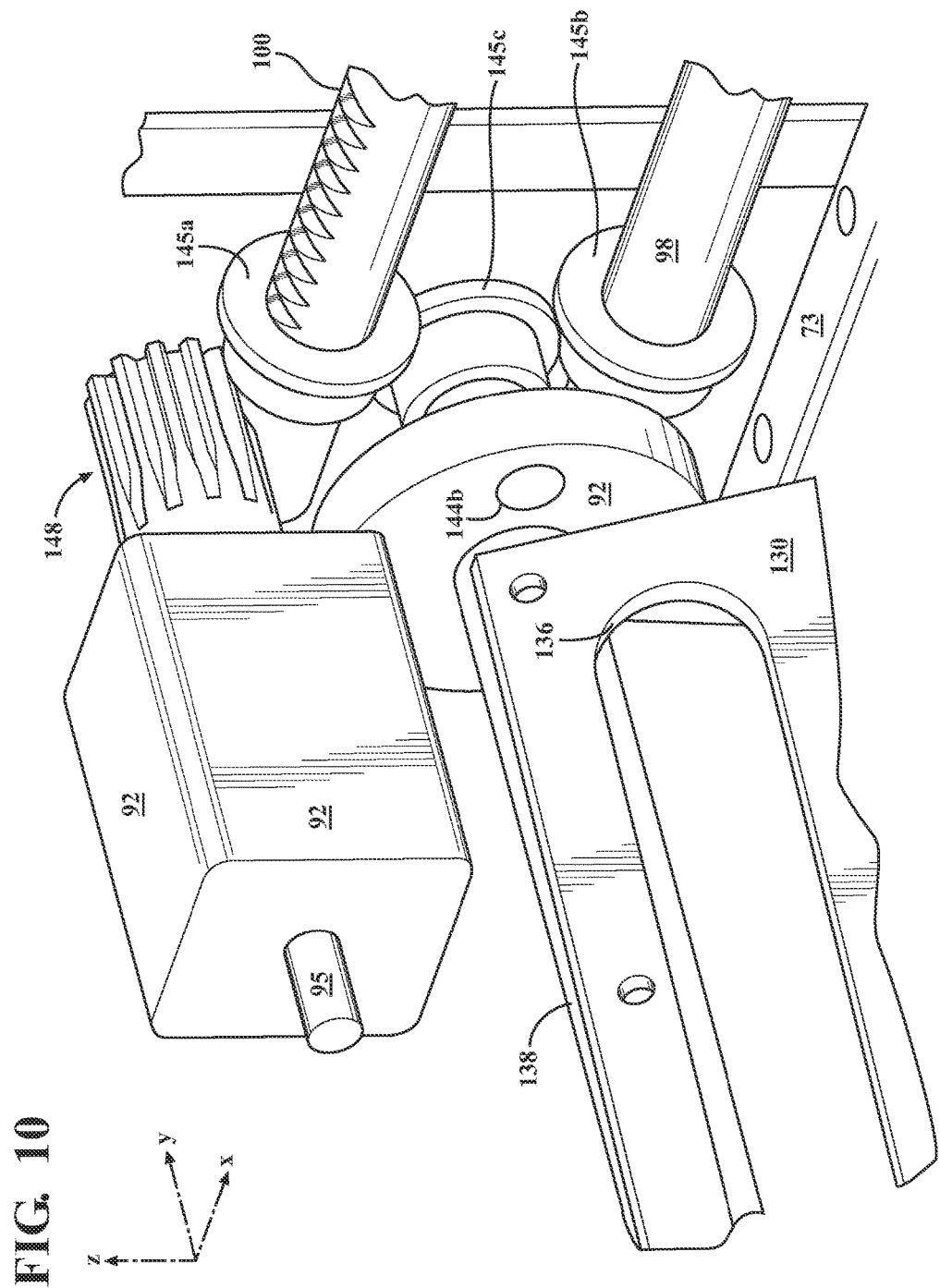
FIG. 10 is a close-up perspective view of a portion of the paste spreader assembly of FIG. 6 showing the carriage removed and the engagement of the rack gear with the spreader assembly motor pinion gear.

Paste spreader assembly 128 is rotatable within the x-z plane to a plurality of rotational positions about an axis of rotation defined by shaft 138. The paste spreader assembly 128 is preferably securely repositionable to the plurality of rotational positions by using a lock. In the example of FIGS. 6-10, the lock 141 comprises a rotating support plate 142 and two spring plungers 146a and 146b. The details of the lock 141 are best seen in FIGS. 8A, 8B, and 10. Rotating support plate 142 comprises two openings 144a and 144b spaced apart along the diameter of rotating support plate 142 on opposite sides of shaft 138. The spring plungers 146a and 146b each have a spring and a head that is preferably a rigid ball. The spring plungers 146a and 146b are attached to the carriage 90 and are compressible and releasable along the y-axis direction. When one of the support plate openings 144a and 144b is aligned with one of the spring plungers 146a and 146b, the spring will force the plunger head into the aligned opening 144a or 144b so that the a portion of the head will project part way into the aligned opening. The projection of the spring head through the aligned opening 144a or 144b will lock the support plate 142 in a rotational position corresponding to the location of alignment between the opening 144a and 144b and the aligned spring plunger 146a and 146b, thereby restraining the rotational movement of the paste spreader assembly 128 in the x-z plane. The openings 144a and 144b and the heads of spring plungers 146a and 146b are preferably shaped in a complementary fashion so that a sufficient rotational force applied to the rotating support plate 142 will cause the engaged spring plunger head to move along the y-axis and disengage from the opening with which it was engaged.

FIG. 8A shows the spreader assembly 128 in a first rotational position in the x-z plane in which support plate opening 144a is aligned with spring plunger 146a and support plate opening 144b is not aligned with spring plunger 146b. In the depicted orientation, the rotation of the spreader assembly 128 in the x-z plane is restrained by the engagement of the head of spring plunger 146a and opening 144a until sufficient rotational force is applied to rotate the rotating support plate 142 to push the head of spring plunger 146a in the y-axis direction and out of alignment with support plate opening 144a.

FIG. 8B shows the spreader assembly in a second rotational position in the x-z plane in which spring plunger 146b is aligned with support plate opening 144b, and spring plunger 146a is not aligned with support plate opening 144a. In the depicted orientation, the rotation of the spreader assembly 128 in the x-z plane is restrained by the engagement of the head of spring plunger 146b and opening 144b until sufficient rotational force is applied to the rotating support plate 142 to push the head of spring plunger 146b in the y-axis direction and out of engagement with support plate opening 144b. In preferred examples, the traversal of the paste spreader assembly 128 across the solidifiable paste container along the x-axis does not create a sufficient force between the solidifiable paste and the blades 130 and 132 to rotate the support plate 142 with sufficient force to disengage either spring plunger 146a and 146b from an opening 144a and 144b within which it is disposed. In general, the springs comprising spring plungers 146a and 146b are selected with spring constants that are sufficient to ensure that disengagement does not occur solely due to contact with the paste during a paste spreading operation and that disengagement does occur when a container wall 76a, 76b or hard stop is reached as discussed further below.

In the rotational positions depicted in FIGS. 8A and 8B, paste spreader assembly 128 is configured to perform a first spreading operation (FIG. 8A) by traveling in the positive x-axis direction (+x) while in a first rotational position and to perform a second spreading operation (FIG. 8B) by traveling in the negative x-axis direction (−x) while in a second rotational position. In certain examples, paste spreader assembly 128 may be rotated to other rotational positions, such as to perform maintenance operations. One such rotational position is shown in FIG. 7. In FIG. 7 paste spreader assembly 128 is rotated such that the leading blade edges 134 and 139 are spaced apart from the top surface of the solidifiable paste container 48 (as defined by the inner frame lip 73) along the build (z) axis. This rotational position is useful for maintenance operations, for example, pulling the solidifiable paste container 48 out of the solidifiable paste container holder 77. Handle 140 allows a user to selectively rotate the paste spreader assembly 128. By rotating the rotating support plate 142 sufficiently, support plate opening 144b can be aligned with the head of plunger 146a to rotate the paste spreader assembly 128 into a position in which both blade leading edges 134 and 139 are spaced apart from the top of the solidifiable paste container. Alternatively, a user can rotate handle 140 to align support plate opening 144a with the head of plunger 146b. Thus, in the example of FIGS. 6-10, the paste spreader assembly 128 can be rotated to two different rotational orientations in which each of the leading blade edges 134 and 139 is spaced apart from the top of the solidifiable paste container 48 along the build (z) axis. The first such orientation is shown in FIG. 7, in which the first and second blades 130 and 132 project away from shaft 138 in a first (positive) direction along the x-axis. In a second rotational orientation (not shown), the first and second blades 130 and 132 project away from shaft 138 in a second (negative) direction along the x-axis. To facilitate the addition of paste to solidifiable paste container 48, blade 130 may be provided with paste refill window 136, which in the example of FIGS. 6-10 comprises an elongated opening extending along the y-axis direction. The paste refill window 136 allows paste to be added to the interior space defined between the opposing faces of the first blade 130 and second blade 132. By adding it to the interior space defined between the opposing faces of the blades 130 and 132, the paste can be added so as to avoid contact with the leading blade (blade 130 in FIG. 7) during a paste spreading operation, which reduces the trapping of paste against the inner walls 76a and 76b of the solidifiable paste container 48 during a paste spreading operation. Second blade 132 may also be provided with a paste refill window.

As illustrated in FIGS. 8A and 8B, in each of the two depicted spreader assembly 128 rotational orientations, one of the first blade 130 and second blade 132 is oriented with its height dimension perpendicular to the bottom 52 of the solidifiable paste container 48 and with the other blade oriented at an angle equal to $\pi/2-\alpha$ radians relative to the bottom 52 of the solidifiable paste container. In this orientation, the leading edge of the perpendicular blade defines a spacing ($\Delta s_1$ or $\Delta s_4$) from the solidifiable paste container bottom 52 along the build (z) axis that is less than the build (z) axis spacing ($\Delta s_2$ or $\Delta s_3$) of the angled blade's leading edge from the solidifiable paste container bottom 52. Thus, in the spreader assembly 128 first rotational orientation of FIG. 8A, the leading edge 139 of second blade 132 is spaced apart from the solidifiable paste container bottom 52 by a distance $\Delta s_1$ along the build (z) axis that is less than the build (z) axis spacing $\Delta s_2$ between the leading edge 134 of first blade 130 and the solidifiable paste container bottom 52. In the spreader assembly 128 second rotational orientation of FIG. 8B, the leading edge 134 of the perpendicular first blade 130 is spaced apart from the solidifiable paste container bottom 52 by a build (z) axis distance $\Delta s_4$ that is less than the build (z) axis spacing $\Delta s_3$ between the leading edge 139 of the angled second blade 132 and solidifiable paste container bottom 52. In certain preferred examples, $\Delta s_1 = \Delta s_4$ and $\Delta s_2 = \Delta s_3$. The leading edges 134 and 139 each have a length along the y-axis and are spaced apart from the shaft 138 by a distance along an axis defined by the height dimensions of their respective blades 130 and 132. In certain examples, the leading edges 134 and 139 are smooth along the y-axis direction. In other examples, the leading edges 134 and 139 are textured along the y-axis direction. In the example of FIGS. 6-10, the leading edges 134 and 139 are textured so that they are serrated. As used herein the term "serrated" refers to a pattern alternating teeth and notches (or "gullets") such as used in the blade of a saw.

In certain examples, the use of textured leading spreader edges can be used to impart an inversely textured profile on the exposed surface of the solidifiable paste that faces upward along the build (z) axis. Because of the rheological properties of solidifiable pastes, it may be difficult to provide a smooth upward facing surface of paste with which to contact the exposed object surface 64 (FIG. 1). With low or medium viscosity materials, the downward pressure applied by the exposed object surface 64 may create a smooth layer of material. However, that will not necessarily be the case with the relatively higher viscosity solidifiable pastes described herein. By providing appropriate texturing, the exposed surface of the solidifiable paste can be provided with a variety of alternating peaks and valleys. The valleys provide a region for receiving displaced material from the adjacent peaks when pressure is applied to the exposed surface of the solidifiable paste by the exposed object surface 64 (FIG. 1), thereby providing a smoother surface of material in contact with the exposed object surface 64. For example, during a paste spreading operation, serrated leading edge 134 or serrated leading edge 139 (depending on the x-axis direction of the paste spreading operation) will impart a series of alternating peaks and valleys extending along the x-axis direction. When the exposed object surface 64 contacts the exposed surface of solidifiable paste, the pressure applied by the exposed object surface 64 against the paste will cause paste from the peaks to fill in the valleys, creating an overall more homogeneous surface and reducing the formation of voids in the interface between the exposed object surface 64 and the unsolidified solidifiable paste. In order to apply such texturing with the serrated leading edges 134 and 139, the trailing blade is preferably positioned with the notches of its leading edge positioned at or slightly above the exposed surface of the solidifiable paste along the build (z) axis and with its teeth positioned beneath the exposed surface of the solidifiable paste.

The paste spreader assembly 128 is traversable in both first and second directions along the x-axis to carry out paste spreading operations. Spreader motor 92 comprises a shaft 95 on which pinion gear 148 (FIG. 10) is mounted. The teeth of pinion gear 148 have lengths oriented along the y-axis direction and engage rack gear 100. Rack gear 100 is attached to carriage 90 via bushing 145a and is oriented with its length along the x-axis. A guide 98 is attached to carriage 90 via bushing 145b. Guide 98 comprises a generally smooth shaft that is oriented with its length along the x-axis and which is spaced apart from rack gear 100 along the build (z) axis direction. The ends of both rack gear 100 and guide 98 are attached to supports 96a (not visible) and 96b (FIG. 6) which are attached to the upper surface 51 of housing 54 (FIG. 1). Rotating support plate 142 is rotatably mounted to carriage 90 via bushing 145c (FIG. 10). Energization of spreader motor 92 causes the pinion gear 148 to rotate. When it rotates in a first rotational direction in the x-z plane, the engagement of pinion gear 148 and rack gear 100 causes the pinion gear 148 (and carriage 90) to travel along the rack gear 100 along a first x-axis direction. When it rotates in a second rotational direction in the x-z plane, the engagement of pinion gear 148 and rack gear 100 causes the pinion gear 148 (and carriage 90) to travel along the rack gear 100 along a second x-axis direction that is opposite the first x-axis direction. As carriage 90 travels in a direction along the x-axis, the shaft 138, handle 140, rotating support plate 142 and blades 130 and 132 travel in the same direction along the x-axis. In certain examples, spreader motor 92 is operatively connected to and receives a signal that is selectively provided from a controller to energize and de-energize the spreader motor 92. In one possible configuration, a limit switch provided on the build platform elevator 58 may be used to determine when build platform 44 has been safely elevated to a build (z) axis position at which the paste spreader assembly 128 can be traversed without colliding with the object 59 (FIG. 1) or the build platform 44. The controller may receive a signal from the limit switch and process it using a program stored in the controller memory and executed by the controller processor to determine when to output a signal to spreader motor 92 to energize the motor 92. Limit switches may also be provided on or proximate two the ends of the rack gear 100 and/or the guide 98 to indicate when the carriage 90 has reached the end of travel in the positive or negative x-axis directions, and the controller may use those limit switch signals to determine when a spreading operation is complete and when to de-energize the spreader motor 92. The same controller or a different controller may also receive signals provided by limit switches located along or proximate to the rack gear 100 and/or guide 98 to when to bring the build platform 44 downward along the build (z) axis to solidify another layer of solidifiable paste.

As best seen in FIG. 6, paste spreader assembly 128 is preferably positioned relative to solidifiable paste container 48 such that the leading edges 134 and 139 of the first blade 130 and second blade 132 are located beneath the top of the solidifiable paste container (i.e., beneath the upward (z-axis) facing surface of the lip 73 of the inner frame 72) and spaced apart from the bottom 52 of the solidifiable paste container 48 by respective distances $\Delta s_1$ and $\Delta s_2$ along the build (z) axis. In the figures, the paste is not shown in the solidifiable paste container 48.

In certain preferred modes of operation, during a paste spreading operation one of the first blade 130 and the second blade 132 will be spaced apart from the other of the first blade 130 and the second blade 132 in the direction of travel of paste spreader assembly 128 along the x-axis. The blade that is positioned farther along the direction of travel during a paste spreading operation may be referred to as the "leading blade," while the blade that is positioned farther behind along the direction of travel may be referred to as the "trailing blade." In a preferred mode of operation, during a paste spreading operation the leading edge of the trailing blade is positioned beneath the exposed upward facing surface of the solidifiable paste along the build (z) axis, and the leading edge of the leading blade is spaced above the exposed surface of the solidifiable paste along the build (z) axis. Thus, in this preferred mode of operation, during a spreading operation, the spreading is carried out by the trailing blade only.

As compared to a single blade spreader assembly, the dual blade spreader assembly 128 of FIGS. 6-10 advantageously reduces the amount of solidifiable paste that is trapped against the inner solidifiable container walls 76a or 76b during a paste spreading operation. If only one of the first blade 130 or the second blade 132 were provided, as the blade approached either of the inner container walls 76a or 76b, the blade would trap a volume of solidifiable paste between the blade and the wall due to the rheological properties of the solidifiable paste. In order to recover the trapped paste for use in subsequent object solidification operations, the blade would have to be lifted above the exposed surface of solidifiable paste along the build (z) axis and reinserted into the paste immediately proximate the wall 76a or 76b. In one exemplary mode of operation, as best seen in FIGS. 8A and 8B, the apparatus of FIGS. 6-10 avoids the necessity of lifting the blades 130 and 132 in this manner.

Referring to FIG. 8A, the paste spreader assembly 128 is shown near the end of a left to right first paste spreading operation along the positive x-axis direction in which the leading edge 134 of the leading blade 130 approaches the inner wall 76b of inner frame 72 of the solidifiable paste container 48. During the paste spreading operation shown in FIG. 8A, the first blade 130 acts as the leading blade and the second blade 132 acts as the trailing blade. In this configuration, the leading edge 134 of the first blade 130 is preferably positioned above the exposed surface of the solidifiable paste (not shown) so as to reduce the amount of paste that is trapped between the first blade 130 and the inner wall 76b of solidifiable paste container 48. Once the first blade 130 begins to engage the inner wall 76b, support plate 142 applies a force against the head of spring plunger 146a that is sufficient to depress the head of spring plunger 146a in the y-axis direction, thereby allowing the support plate 142 to rotate in the clock-wise direction. As the support plate 142 rotates, opening 144b will eventually come into alignment with the head of spring plunger 146b, at which point the spring force within the spring plunger 146b will force the head of spring plunger 146b to move along the y-axis into opening 144b. At this point, first blade 130 has been rotated so that its height dimension is perpendicular to the bottom 52 of the solidifiable paste container 48. At the same time, the second blade 132 has been rotated with its height dimension oriented at an angle of $2n$-$a$ relative to the bottom 52 of the solidifiable paste container 48. With the paste spreader assembly 128 now releasably secured in the second rotational position in the x-z plane, the spreader assembly is ready to begin a second paste spreading operation in which the paste spreader assembly 128 travels from right to left in the negative x-axis direction. In this second paste spreading operation, the second blade 132 will act as the leading blade and will remain spaced apart from the first blade 130 in the negative x-axis direction as the paste spreader assembly 128 travels in the negative x-axis direction. As indicated previously, in a preferred mode of operation, the leading edge 139 of the second blade 132 will be spaced above the exposed surface of the solidifiable paste along the build (z) axis, and the leading edge 134 of the first blade 130 will be positioned beneath the exposed surface of the solidifiable paste along the build (z) axis. Once the second blade 132 reaches and engages inner container wall 76a, the engagement will cause the rotating support plate 142 to apply a force to the head of spring plunger 146a, thereby depressing it along the y-axis and rotating the rotating support 142 plate in the counter clockwise direction in the x-z plane until the head of spring plunger 146a engages the opening 144a in support plate 142 to lock the support plate 142 into the first rotational position shown in FIG. 8A.

As depicted in FIGS. 6-10, the rotation of the paste spreader assembly 128 in the x-z plane occurs due to the engagement of whichever blade 130 and 132 is the leading blade and one of the container walls 76a or 76b. However, other mechanisms may be provided to rotate the spreader assembly 128. In one example, one or more "hard stops" are provided in the solidifiable paste container. In one implementation, one or two upside-down L-shaped members may be provided on each side of the solidifiable paste container 74 and spaced apart along the direction of travel of the spreader assembly 128 (i.e., spaced apart along the x-axis in the apparatus of FIGS. 6-10). The hard stops would be positioned with one of the sides of the "L's" extending along a direction perpendicular to the direction of travel of the paste spreader assembly 128 (i.e., along the y-axis in the apparatus of FIGS. 6-10) and positioned so engage the leading blade of the paste spreader assembly 128 proximate the container walls 76a and 76b. In one example, pairs of upside-down L members are spaced apart along the x-axis, and the two members of each pair are spaced apart from one another along the y-axis with respective portions of each member projecting inwardly along the y-axis toward the other member.

In certain examples, the use of such hard stops beneficially avoids relying on the collision of the leading blade and the container walls 76a and 76b, which may reduce wear on and better preserve the integrity of container 74. As an alternative to relying on the physical engagement of a leading spreader blade with a container 74 wall or other hard stop, the paste spreader assembly may be operatively connected to a motor that adjusts the rotational orientation of the spreader assembly 128 from that of FIG. 8A to that of FIG. 8B (and vice-versa) without relying on such physical engagement. In one example, limit switches may be provided that determine the location of the paste spreader assembly 128 along the direction of travel (i.e., the x-axis in FIGS. 6-10), and a controller may be used to selectively energize a rotational motor in response to signals received from the limit switches to adjust the rotational position of the paste spreader assembly 128.

Figure 12:
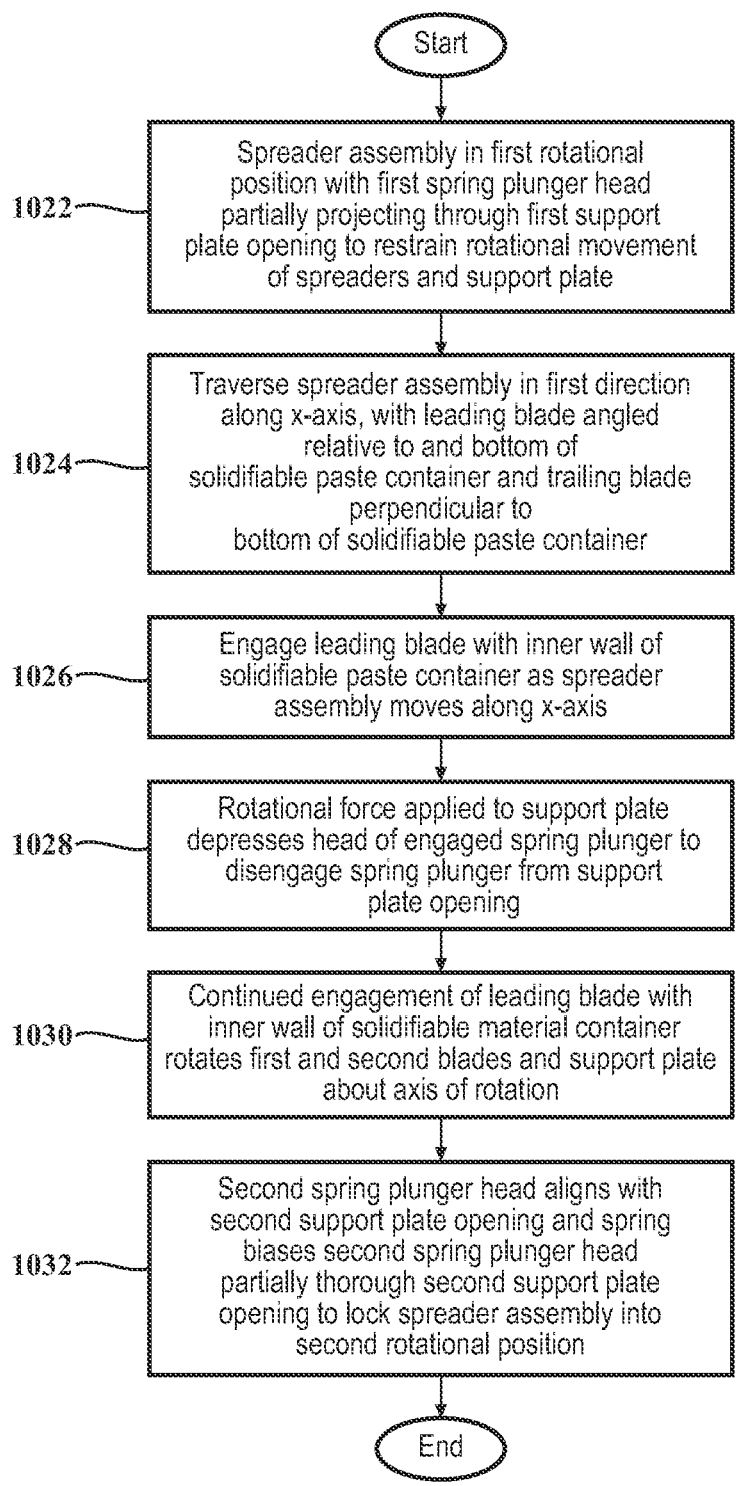
FIG. 12 is a flow chart depicting an exemplary set of steps for the step of moving the paste spreader relative to the solidifiable paste container or vice-versa in FIG. 11.

Referring to FIG. 12, an exemplary method of carrying out step 1018 of FIG. 11 ("Move spreader relative to solidifiable material container or vice-versa") using the apparatus of FIGS. 6-10 will now be described. In accordance with the method, in step 1022 the paste spreader assembly 128 is located proximate container wall 76a or 76b and is provided in a first rotational orientation with a first spring plunger head projecting through a first support plate hole. For example, as shown in FIG. 6, paste spreader assembly 128 starts a paste spreading operation proximate inner container wall 76a in a first rotational orientation depicted in FIG. 8A. In the first rotational orientation, the head of spring plunger 146a is aligned with support plate opening 144a so as to project partially through the opening 144a and lock the support plate 142 against rotation, thereby restraining the rotational movement of a the trailing spreader (second spreader 132) and the leading spreader (first spreader 130). In step 1024 the paste spreader assembly 128 is traversed along a first x-axis direction relative to the build platform 44 and the bottom 52 of the solidifiable paste container 48 with the trailing blade oriented perpendicularly to the bottom 52 of the solidifiable paste container 48 and the leading blade oriented at an angle of 2n-a relative to the bottom 52 of solidifiable paste container 48. As with the apparatuses of FIGS. 2-5, in certain examples, paste spreading operations may be carried out with the apparatus of FIGS. 6-10 only when the current layer occupies an x-y region that intersects or overlaps with that of the previously formed layer. One or more controllers used to operate the build platform motor (not shown) and the paste spreader motor 90 may be operated in the manner described with respect to the apparatuses of FIGS. 2-5 to limit paste spreading operations to those situations in which the current layer occupies an x-y region that overlaps with or intersects the x-y region of the immediately preceding layer.

As the leading blade of the paste spreader assembly 128 approaches an inner wall (76a or 76b) of the solidifiable paste container 48, the leading blade engages the inner wall (76a or 76b) (step 1026). An illustration of the moment before such engagement is shown in FIG. 8A. The engagement causes the engaged blade to apply a rotating force to rotating support plate 142. The rotating force causes the rotating support plate 142 to exert a force against the head of the spring plunger that is currently engaged with one of the support plate openings 144a and 144b. In the case of FIG. 8A, the rotating support plate 142 would exert a force against the head of spring plunger 146a, causing it to depress the head of spring plunger 146a along the y-axis and out of engagement with rotating support plate opening 144a (step 1028). The continued engagement of the leading blade with the inner wall of the solidifiable paste container 48 (e.g., the continued engagement of leading blade 130 with inner container wall 76b in FIG. 8A) rotates the rotating support plate 142 and the first and second blades 130 and 132 about the axis of rotation defined by shaft 138 (step 1030) until another support plate opening engages another spring plunger head (step 1032). In the example of FIGS. 8A and 8B, the continued engagement of the leading spreader (first spreader 130) and the inner wall 76b of solidifiable paste container 48 rotates the rotating support plate 142 in a clockwise direction until opening 144b comes into alignment with the head of spring plunger 146b, at which point the head of spring plunger 146b engages the opening 144b to lock the rotational position of the rotating support plate 142 into the position shown in FIG. 8B. Thus, steps 1022 to 1032 provide one exemplary way of carrying out step 1018 of FIG. 11.

As with the example of FIGS. 2-3, in general, in the apparatus of FIGS. 6-10 it is preferable to space the leading edge of the trailing blade by a distance Δs that is closer to the bottom 52 of the solidifiable paste container 48 for higher viscosity solidifiable pastes relative to lower viscosity solidifiable pastes. In one example, the supports 96a (not shown) and 96b (FIG. 6) may be vertically adjustable to adjust the distance of the rack gear 100 and guide 98 from the bottom 52 of the solidifiable paste container to allow for variable build (z) axis spacing between the leading edges 134 and 139 of blades 130 and 132 in any given rotational position of the rotating support plate 142. In other examples, the additional support plate holes and spring plungers may be provided so that the trailing blade can be angled relative to the bottom 52 of the solidifiable paste container 48 as a means of varying the build (z) axis spacing between the trailing blade and the bottom 52 of the solidifiable paste container 48. In certain examples, the apparatus of FIGS. 6-10 may also be configured for build (z) axis vibration to assist in breaking up bubbles and/or agglomerations of solidifiable paste.

Figure 14:
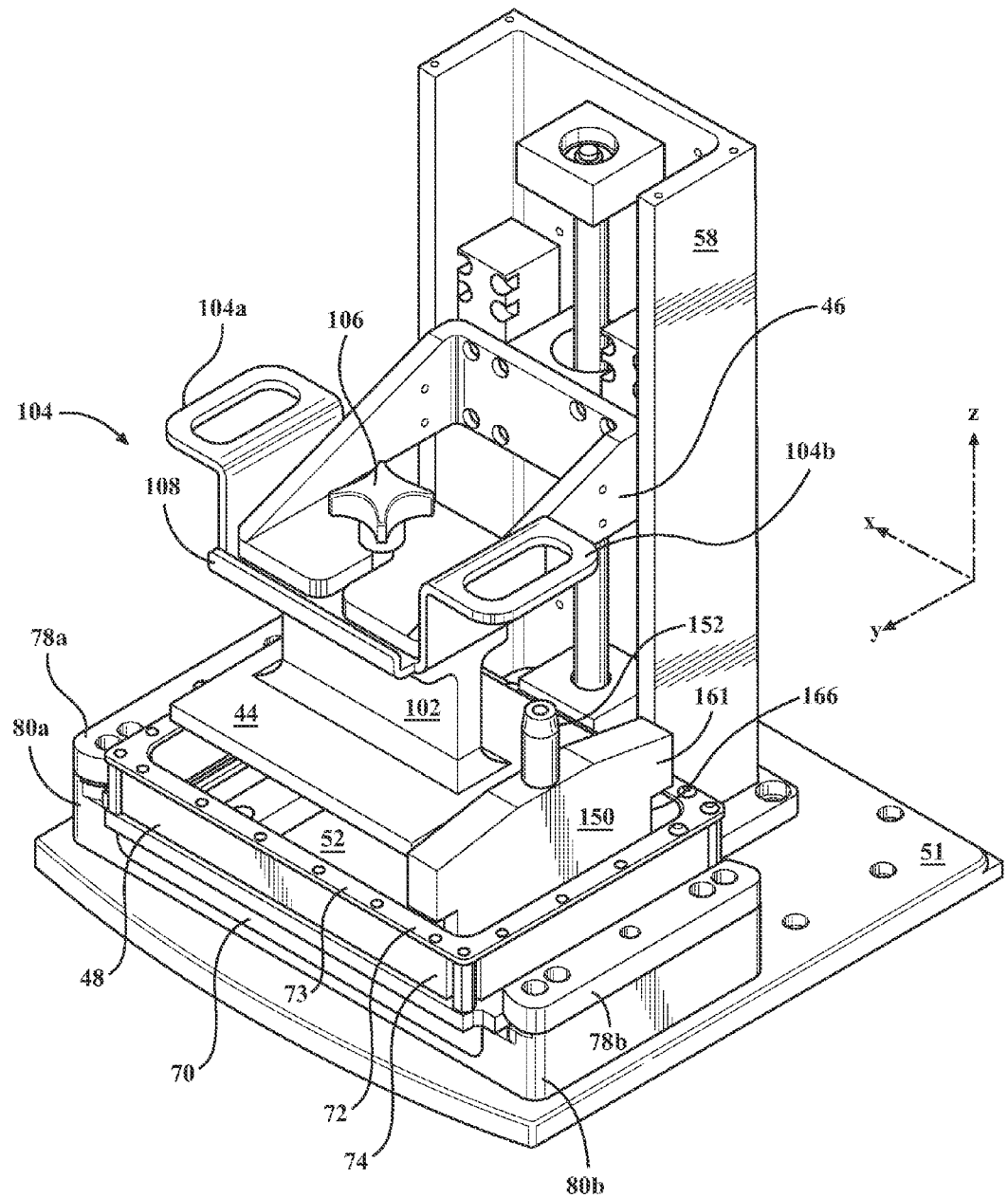
FIG. 14 is an apparatus for making a three-dimensional object from a solidifiable paste in an upside down build process, wherein the apparatus includes a solidifiable paste dispenser with the dispenser travel axis movement assembly removed.
Figure 15:
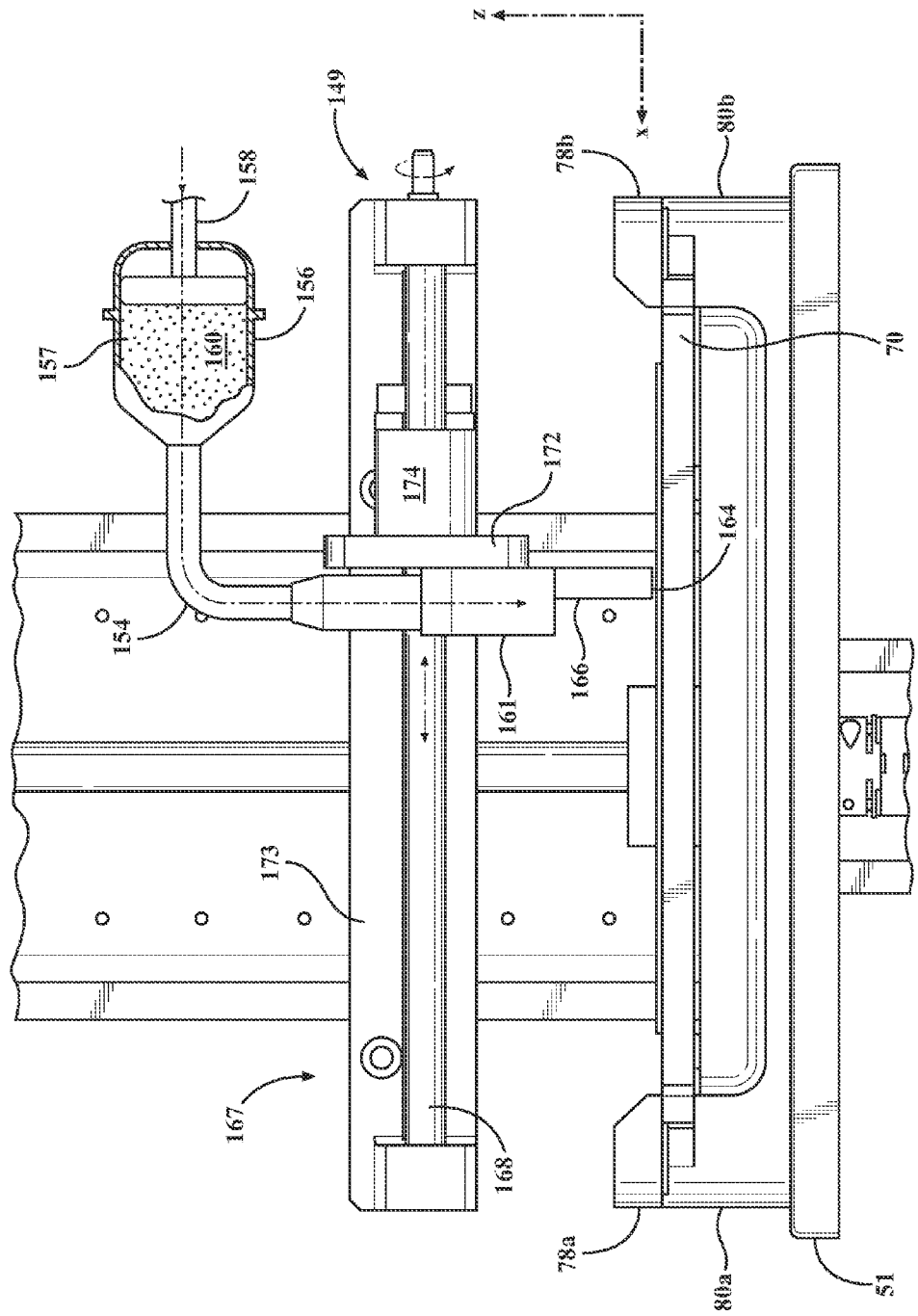
FIG. 15 is a front elevational view of the apparatus of FIG. 14.
Figure 16:
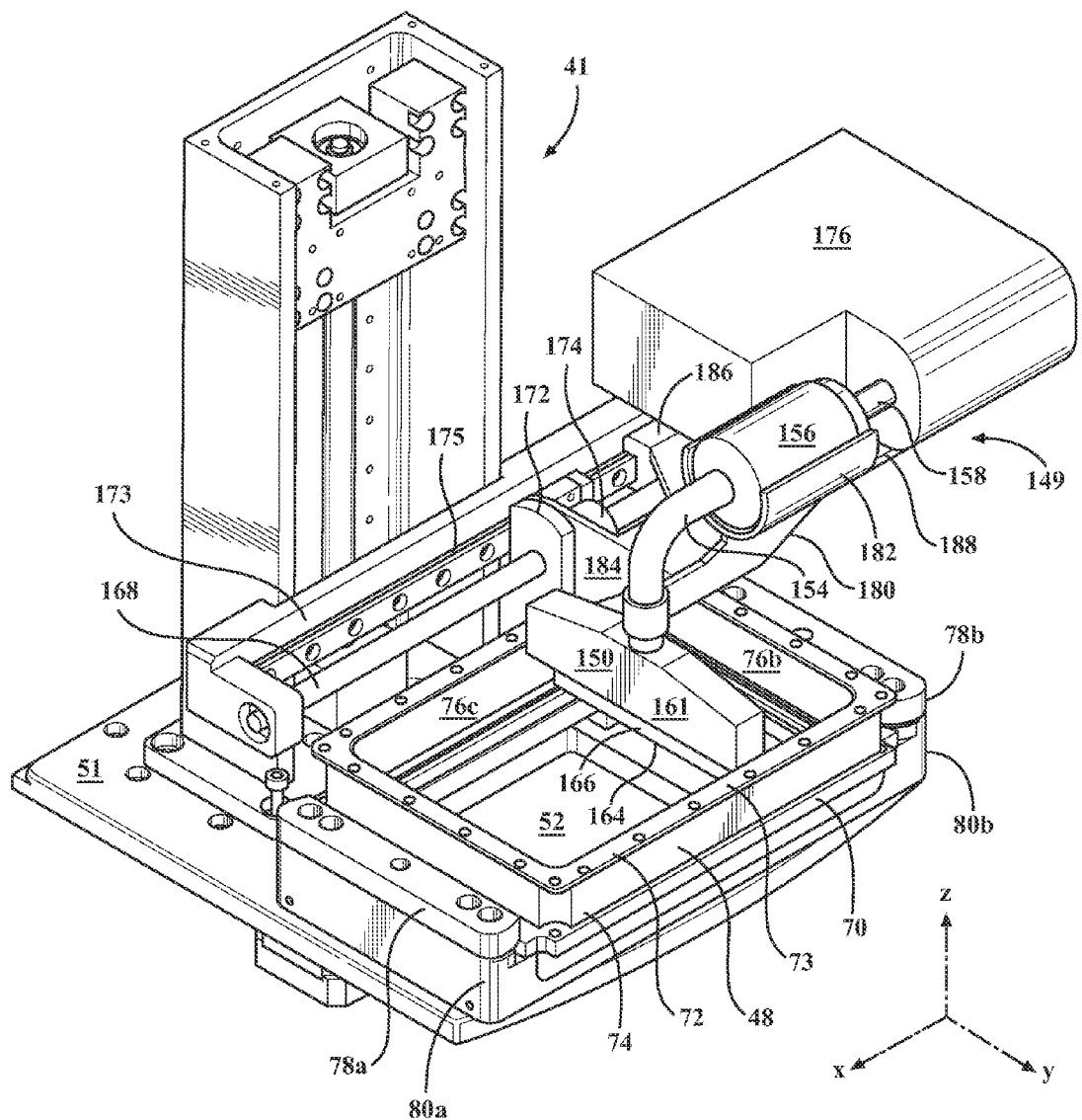
FIG. 16 is a perspective view of the apparatus of FIG. 14 with the build platform and support removed and the solidifiable paste pump and solidifiable paste dispenser travel axis movement assembly shown.

Referring to FIGS. 14-16, a system 41 for making a three-dimensional object from a solidifiable paste is depicted. Like numerals in FIGS. 14-16 refer to like parts in the previous examples. System 41 is configured similarly to the system of FIG. 2. However, unlike the system of FIG. 2, system 41 includes a solidifiable paste dispenser 150 that dispenses solidifiable paste from its interior while moving along the travel (x) axis. Solidifiable paste dispenser 150 is movable along the travel (x) axis using a travel axis movement assembly 167. A motor (not shown) is operatively connected to the travel axis movement assembly 167 and is energizable to cause the solidifiable paste dispenser 150 to translate along the travel (x) axis.

Solidifiable paste dispenser 150 includes an upper section 161 and a lower section 166 positioned adjacent one another along the build (z) axis. Lower section 166 includes an outlet 164 that comprises an elongated rectangular opening that is perpendicular to the build (z) axis and which has a length along the y-axis. Inlet nozzle 152 projects away from upper section 161 along the build (z) axis such that the upper section 161 is located between inlet nozzle 152 and lower section 166 along the build (z) axis. The inlet nozzle 152, upper section 161, and lower section 166 each have respective internal volumes for holding solidifiable paste and collectively define a flow path from the inlet nozzle 152 to the outlet 164 for dispensing solidifiable paste 160 onto the rigid or semi-rigid solidification substrate 52 of the solidifiable paste container 48. The rectangular shape of outlet 164 causes the solidifiable paste dispenser 150 to dispense solidifiable paste in a substantially linear pattern having a length along the y-axis while the dispenser 150 moves along the travel (x) axis.

Solidifiable paste dispenser 150 is part of a solidifiable paste dispenser assembly 149 which also includes a solidifiable paste reservoir 156, a conduit 154, a pump 176, and a piston 158. Pump 176 is preferably a precision syringe pump that is energizable to actuate piston 158. The solidifiable paste reservoir 156 (which may also be referred to as a cartridge) is preferably vacuum-filled with solidifiable paste to prevent air bubble formation and includes a variable internal volume 157 in which solidifiable paste 160 is located. Piston 158 is displaceable along the travel (x) axis to vary the volume of the variable internal volume 157.

The variable internal volume 157 is in fluid communication with the internal volumes of conduit 154, inlet nozzle 152, upper section 161 of solidifiable paste dispenser 150 and lower section 166 of solidifiable paste dispenser 150. The internal volumes of each of these components effectively define a volume for holding solidifiable paste 160 which is variable because of the ability to vary the internal volume 157 of the solidifiable paste reservoir 156. During a paste dispensing operation, the variable internal volume 157 of solidifiable paste reservoir 156, and the internal volumes of conduit 154, inlet nozzle 152, upper section 161 and lower section 166 are full of solidifiable paste 160 (and preferably air-bubble free) such that displacement of the piston 158 along the travel (x) axis in a direction toward conduit 154 causes solidifiable paste 160 to be forced through solidifiable paste dispenser opening 164 and onto rigid or semi-rigid solidification substrate 52.

Travel axis movement assembly 167 is provided to move the solidifiable paste dispenser 150 along the travel (x) axis. An externally-threaded shaft 168 (the threads are not visible in the figures) is provided with an internally threaded nut 172 and ball screw nut 174 which are provided as a single, integral part and are mounted on shaft 168. Rotation of the externally-threaded shaft 168 about its longitudinal axis causes the threaded nut 172 and ball screw nut 174 to translate along the travel (x) axis. A motor (not shown) is also provided and is operable to selectively rotate the externally-threaded shaft 168 about its longitudinal axis.

As shown in FIG. 16, bracket assembly 180 is provided and operatively connects the solidifiable paste dispenser 150 to the threaded nut 172/ball screw nut 174 to cause the solidifiable paste dispenser 150 to translate along the travel (x) axis as the threaded nut 172/ball screw nut 174 translate along the travel (x) axis. Bracket assembly 180 includes a solidifiable paste reservoir cradle 182 which is shaped to conform to the shape of solidifiable paste reservoir 156. Bracket assembly 180 further includes a pump platform 188 for vertically supporting the solidifiable paste pump 176. Bracket assembly 180 also includes a rail guide 186 which slidingly engages rail 175. Transverse member 184 is also a part of the bracket assembly 180 and connects the bracket assembly 180 to the threaded nut 172/ball screw nut 174 to cause the bracket assembly 180 to translate with the threaded nut 172/ball screw nut 174. In the embodiment shown in FIG. 16, the transverse member 184 has an opening for receiving the threaded nut 172/ball screw nut 174 therethrough and is bolted to the threaded nut 172. It should be noted that in FIG. 14, the bracket assembly 180 and the solidifiable paste dispenser movement assembly 167 are not shown to better demonstrate the spatial relationship between the build platform 44 and the solidifiable paste dispenser 150. In FIG. 15 the solidifiable paste pump 176 and the bracket assembly 180 are not shown, and in FIG. 16 the build platform 44, build platform support 46, build platform holder 104 and build platform holder upper engagement surface 108 are not shown.

A method of operating system 41 to make a three-dimensional object from a solidifiable paste will now be described. A build platform motor (not shown) is energized to elevate build platform 44 along the build (z) axis in a direction away from solidifiable paste container 48 to provide clearance for the movement of solidifiable paste dispenser 150. If a partially-formed object is present on the build platform 44, the build platform 44 is elevated along the build (z) axis to a height sufficient to ensure that the lower-most portion of the exposed object surface is above the solidifiable paste reservoir 156 and the solidifiable paste pump 176.

A paste dispensing operation is then commenced. The solidifiable paste dispenser motor (not shown) is energized to rotate externally-threaded shaft 168 about its longitudinal axis, which is parallel to the travel (x) axis. The rotation of the externally-threaded shaft 168 causes threaded nut 172/ball screw nut 174 to translate along the travel (x) axis. Because bracket assembly 180 is connected to the threaded nut 172/ball screw nut 174 via transverse member 184 and slidingly engages rail 175 via the engagement of the rail guide 186 with the rail 175, the solidifiable paste dispenser 150, solidifiable paste reservoir 156, conduit 154 and solidifiable paste pump 176 translate with the threaded nut 172/ball screw nut 174 along the travel (x) axis.

As the solidifiable paste dispenser 150 translates along the travel (x) axis, paste is dispensed out of opening 164 and onto rigid or semi-rigid solidification substrate 52. Dispensing pump 176 is operated to displace the piston 158 along the travel (x) axis toward conduit 154, thereby forcing solidifiable paste 160 to flow out of dispenser opening 164. The reduction of the variable internal volume 157 of solidifiable paste reservoir 156 will correspond to the flow rate of solidifiable paste through outlet 164. The layer thickness of deposited paste Δz' can be determined as follows:

$$\Delta z' = \frac{1}{v_x L_y} \frac{dQ}{dt} \qquad (1)$$

wherein, Δz' is the dispensed solidifiable paste layer thickness (mm);
$v_x$ is the velocity of the solidifiable paste dispenser along the travel (x) axis (m/sec);
$L_y$ is the length of the solidifiable paste dispenser opening 164 along the y-axis (m);

dQ/dt is the volumetric flow rate of solidifiable paste from the solidifiable paste dispenser 150 (m³/sec).

In equation (1) the $v_x$ and dQ/dt are assumed to be constant, although they need not be, in which case equation (1) would be a differential equation.

The volumetric flow rate dQ/dt may be related to the movement of the piston 158 based on the rate at which the piston moves dx/dt and the cross-sectional area of the solidifiable paste reservoir 156 as follows:

$$\frac{dQ}{dt} = A\frac{dx}{dt} \quad (2)$$

wherein, dQ/dt is the volumetric flow rate of solidifiable paste from the solidifiable paste dispenser 150 (m³/sec);

A is the internal cross-sectional area of solidifiable paste reservoir 156; and dx/dt is the speed of movement of piston 158 along the travel (x) axis.

Assuming the piston 158 and solidifiable paste dispenser 150 move at constant respective speeds along the travel (x) axis, to deposit a desired paste thickness Δz', the rate of movement of the piston along the travel (x) axis can be related to the speed of movement of the solidifiable paste reservoir piston 158 as follows:

$$\Delta z' = \frac{A}{v_x L_y}\frac{dx}{dt} \quad (3)$$

In certain preferred implementations, one or more controllers are operatively connected to the solidifiable paste pump 176 and the motor that rotates the externally-threaded shaft 168 to coordinate the movement of the piston 158 (relative to solidifiable paste reservoir 156 and conduit 154) and the solidifiable paste dispenser 150 along the travel (x) axis. The thickness of deposited paste Δz', will not necessarily be the same as, and will preferably be greater than, the layer thickness Δz used to form a new layer of the three-dimensional object. In certain examples, prior to an object layer solidification operation, the previously formed object layer is pressed into the upward facing, exposed surface of the paste, causing some paste displacement, and yielding a layer of solidifiable paste between the lower-most, exposed object surface and the rigid or semi-rigid solidification substrate 52 which has a thickness Δz that is less than the thickness Δz' of the freshly-deposited paste. Also, the lower section 166 of solidifiable paste dispenser 150 will, in many instances, act as a paste spreader and will displace paste 160 as the dispenser 150 moves along the travel (x) axis.

Following the paste dispensing operation, the solidifiable paste dispenser 150 is translated along the travel (x) axis to a position that is out of the way of the build platform 44 (i.e., out of the x-y area occupied by the build platform 44). In certain apparatuses, there may be sufficient clearance on either side of the build platform 44 along the travel (x) axis to perform bi-directional dispensing and simply leave the dispenser 150 proximate the wall of container 48 at which the dispensing operation was completed. In other apparatuses, it may be necessary to return the solidifiable paste dispenser 150 to the same "home" position on the same side of the solidifiable paste container 48 after a paste dispensing operation and before an object layer solidification operation. In the system 41 of FIGS. 14-16, there is insufficient clearance to allow the dispenser 150 to remain adjacent container sidewall 80a during an object layer solidification operation. In that case, the solidifiable paste dispenser 150 is returned to the position shown in FIG. 14 proximate container sidewall 80b before the build platform 44 descends along the build (z) axis into position to solidify the next object layer.

A motor (not shown) operatively connected to build platform 44 is energized to cause build platform 44 to descend along the build (z) axis until the lower-most exposed surface of the three-dimensional object is spaced apart from the rigid or semi-rigid solidification substrate 52 by a distance that is equal to the desired thickness of the next object layer to be formed, Δz. In general, the lower-most (along the build (z) axis) exposed object surface will push into the solidifiable paste 160, displacing some amount of paste 160 away from the exposed object surface to a different x-y region within the container 48. Because of the viscous nature of the paste 160, areas of the paste that are solidified will leave recesses or indentations in the exposed upward facing surface of the dispensed paste within container 48. Thus, the thickness of dispensed paste Δz' is preferably great enough to ensure that sufficient paste may be provided within such recesses or indentations to form the next layer thickness Δz.

An object layer solidification operation is then commenced. In certain examples, a linear solidification device positioned beneath (along the build (z) axis) the rigid or semi-rigid solidification substrate 52 is traversed along the travel (x) axis and either projects or scans solidification energy along the y-axis. In DLP type systems, the DLP will project a 2-D image of the next object layer up through the rigid or semi-rigid solidification substrate 52 in the x-y plane. Following the object solidification operation, the build platform 44 is then elevated to begin another paste dispensing operation and form a new object layer.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A method of forming a three-dimensional object, comprising:

traversing a solidifiable paste dispenser along a first axis while dispensing a solidifiable paste from the solidifiable paste dispenser;

moving a build platform along a build axis to contact an exposed surface of an object adhered to the build platform with the solidifiable paste; and supplying solidification energy to a portion of the solidifiable paste in a pattern corresponding to the three-dimensional object, thereby solidifying the portion of the solidifiable paste, wherein the solidifiable paste dispenser is part of a solidifiable paste dispenser assembly that further comprises a solidifiable paste reservoir having a variable internal volume, the solidifiable paste dispenser has an internal volume in fluid communication with the variable internal volume, and the step of dispensing solidifiable paste from the solidifiable paste dispenser comprises reducing the variable internal volume, the steps of traversing the solidifiable paste dispenser along the first axis and reducing the variable internal volume of the solidifiable paste reservoir are carried out to dispense a selected thickness along the build axis of solidifiable paste from the solidifiable paste dispenser, the selected thickness is a first selected thickness, and the step of moving the build platform along the build axis to contact an exposed surface of the object with the solidifiable paste comprises forming a second selected thickness of the solidifiable paste between the exposed surface of the object and a rigid or semi-rigid solidification substrate that is transparent and/or translucent.

2. The method of claim 1, wherein the step of dispensing solidifiable paste from the dispenser comprises dispensing paste in a linear pattern along a second axis while traversing the solidifiable paste dispenser along the first axis.

3. The method of claim 1, wherein the solidifiable paste dispenser has an inlet and an outlet, and the outlet is located between a source of the solidification energy and the solidifiable paste reservoir.

4. The method of claim 1, wherein the step of supplying solidification energy to a portion of the dispensed solidifiable paste in a pattern corresponding to the three-dimensional object comprises projecting the solidification energy through the rigid or semi-rigid solidification substrate to solidify a region of the solidifiable paste to a thickness equal to the second selected thickness.

5. The method of claim 1, wherein the solidifiable paste reservoir is a vacuum filled cartridge.

6. The method of claim 1, wherein a solidifiable paste container further comprises a plurality of sidewalls.

7. The method of claim 1, wherein the rigid or semi-rigid solidification substrate has an upper surface to which a film coating is adhered.

8. The method of claim 1, further comprising:
providing a solidifiable paste dispenser travel assembly comprising an externally-threaded shaft having an internally threaded nut mounted thereon, and a bracket assembly connected to the internally-threaded nut, wherein the solidifiable paste dispenser is connected to the bracket assembly and rotation of the externally-threaded shaft causes the internally-threaded nut to translate along a travel axis relative to the externally-threaded shaft.

9. The method of claim 1, wherein the solidifiable paste dispenser comprises an outlet having a length along a second axis.

10. The method of claim 9, wherein the solidifiable paste dispenser comprises an inlet, the inlet and the outlet are spaced apart from one another along the build axis and are in fluid communication with one another.

* * * * *